US012624829B2

(12) United States Patent
Martin

(10) Patent No.: US 12,624,829 B2
(45) **Date of Patent: *May 12, 2026**

(54) INTERACTIVE LED SYSTEM FOR ENHANCING BILLIARD GAMEPLAY

(71) Applicant: Blake Robert Martin, Cypress, TX (US)

(72) Inventor: Blake Robert Martin, Cypress, TX (US)

(73) Assignee: Blake Martin, Cypress, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/221,113

(22) Filed: May 28, 2025

(65) Prior Publication Data

US 2025/0290625 A1 Sep. 18, 2025

Related U.S. Application Data

(63) Continuation of application No. 18/833,139, filed as application No. PCT/US2023/061847 on Feb. 2, 2023, now Pat. No. 12,345,406.

(60) Provisional application No. 63/267,765, filed on Feb. 9, 2022.

(51) Int. Cl.

| | |
|---|---|
| ***F21V 33/00*** | (2006.01) |
| ***F21V 23/00*** | (2015.01) |
| ***F21W 131/40*** | (2006.01) |
| ***F21Y 103/10*** | (2016.01) |

(Continued)

(52) U.S. Cl.

CPC .......... *F21V 33/008* (2013.01); *F21V 23/003* (2013.01); *F21W 2131/40* (2013.01); *F21Y 2103/10* (2016.08); *F21Y 2113/00* (2013.01); *F21Y 2115/10* (2016.08)

(58) Field of Classification Search

CPC .......... F21V 23/00–009; F21V 33/008; F21W 2131/40; F21Y 2103/10; F21Y 2113/00; F21Y 2115/10

See application file for complete search history.

(56) References Cited

U.S. PATENT DOCUMENTS 9,485,399 B2 * 11/2016 Bacus .................. H04N 9/8211

OTHER PUBLICATIONS

"U.S. Appl. No. 18/833,139, Corrected Notice of Allowability mailed May 19, 2025", 3 pgs.

(Continued)

*Primary Examiner* — Jason M Han

(74) *Attorney, Agent, or Firm* — SCHWEGMAN LUNDBERG & WOESSNER, P.A.

(57) ABSTRACT

A system for use with a billiards table may include addressable multi-color LED strips, a controller and a user device. The controller may be configured to send signals through the LED strips to control which one or more pixels are activated and one or more colors of light to be produced by corresponding one or more LEDs for the one or more activated pixels. The user device may communicate with the controller and may implement a program configured to enable a user of the user device to send lighting commands to the controller during gameplay. The lighting commands may indicate user-desired changes to lighting provided by the addressable multi-color LED strips. The controller may send corresponding signals to the addressable multi-color LED light strips to implement the changes to the lighting.

20 Claims, 17 Drawing Sheets

(51) Int. Cl.
*F21Y 113/00* (2016.01)
*F21Y 115/10* (2016.01)

(56) References Cited

OTHER PUBLICATIONS

"U.S. Appl. No. 18/833,139, Notice of Allowance mailed Feb. 25, 2025", 11 pgs.

* cited by examiner

INTERACTIVE LED SYSTEM FOR ENHANCING BILLIARD GAMEPLAY

CLAIM OF PRIORITY

This application is a continuation of and claims the benefit of priority of U.S. application Ser. No. 18/833,139, filed Jul. 25, 2024, which is a U.S. National Stage Filing under 35 U.S.C. § 371 from International Application No. PCT/US2023/061847, filed on Feb. 2, 2023, and published as WO2023/154654 on Aug. 17, 2023, which claims the benefit of U.S. Provisional Application No. 63/267,765 filed on Feb. 9, 2022; the benefit of priority of each of which is hereby claimed herein, and which applications and publication are hereby incorporated herein by reference in their entireties.

TECHNICAL FIELD

This document relates generally to billiard table accessories, and more particularly, but not by way of limitation, to systems, devices, and methods for interacting with a user to enhance the gameplay experience using light emitting diodes (LEDs).

BACKGROUND

The game of billiards has been around for over six hundred years without much change in the game's appearance or play. The game of billiards is losing popularity as a pastime with the introduction of gaming systems, or other technology such as computers and phones. For example, in a typical public setting, one is likely to see more people attracted to their own phones than the standard pool table. Additionally, many families may purchase a pool table for their homes, but they often quickly bore of the new purchase and fail to use it.

There is a need for an attraction to enhance the game of billiards for players of all abilities through user-interaction.

SUMMARY

An example (e.g., "Example 1") of a system for use with a billiards table may include addressable multi-color LED strips, a controller and a user device. Each of the LED strips may have a length corresponding to a length of a bumper of the billiards table. Each bumper of the billiards table corresponds to one of the addressable multi-color LED strips (e.g., the LED strip substantially spans a length of the bumper). Each the LED strips may be electrically connected in series, and include a plurality of LEDs and a plurality of addressable pixels. Each of the addressable pixels may include one or more of the plurality of LEDs. The controller may be connected to an end of the series-connected LED strips, and may be configured to send signals through the LED strips to control which one or more pixels are activated and one or more colors of light to be produced by corresponding one or more LEDs for the one or more activated pixels. The user device may be configured to communicate with the controller and to implement a program configured to enable a user of the user device to send lighting commands to the controller during gameplay. The lighting commands may be indicative of user-desired changes to lighting provided by the addressable multi-color LED strips. The controller may be configured to implement the commands by sending corresponding signals to the addressable multi-color LED light strips to implement the changes to the lighting.

In Example 2, the subject matter of Example 1 may optionally be configured such that the lighting commands include a call-your-shot command that is indicative of a selection of a pocket. The controller may be configured to implement the call-your-shot command by sending corresponding signals to the addressable multi-color light strips to identify the selection of the pocket using an identifiable color for one or more pixels proximate to the pocket.

In Example 3, the subject matter of Example 2 may optionally be configured such that the selection of the pocket may be identified by lighting at least one pixel on each side of the pocket using the identifiable color. Alternatively, the pocket may be identified using pixel(s) on only one side of the pocket. Additionally, or alternatively, pocket LEDs positioned at the pocket may be used to identify the pocket.

In Example 4, the subject matter of any one or more of Examples 2-3 may optionally be configured such that a remainder of the pixels around the table correspond to another color different from the identifiable color.

In Example 5, the subject matter of any one or more of Examples 2-4 may optionally be configured such that the selection of the pocket is identified using a static light pattern by providing, until another command is received or a timer expires, constant red, green and blue values to the same one or more pixels proximate to the pocket.

In Example 6, the subject matter of any one or more of Examples 2-5 may optionally be configured such that the selection of the pocket is identified using an animated light pattern by performing, until another command is received or a timer expires, a process that includes: varying at least one of a red value, a green value or a blue value to the one or more pixels, or providing light to different ones of the one or more pixels proximate to the pocket.

In Example 7, the subject matter of any one or more of Examples 1-6 may optionally be configured such that the lighting commands include a pattern command that is indicative of a selection of a pattern. The controller may be configured to implement the pattern command by sending corresponding signals to the addressable multi-color light strips to provide a spatial pattern of light along the addressable multi-color LED strips according to the selection and provide a temporal pattern for changing the spatial pattern of light over time.

In Example 8, the subject matter of Example 7 may optionally be configured such that the spatial pattern is provided by sending RGB values to one or more LED controllers associated with one or more pixels, and the temporal pattern is provided by varying at least one of a red value, a green value or a blue value to the one or more pixels, or providing light to different ones of the one or more pixels proximate to the pocket.

In Example 9, the subject matter of any one or more of Examples 1-8 may optionally be configured such that the lighting commands include at least one scorekeeper command that is indicative of at least a score between two players or two teams. The controller may be configured to implement the at least one scorekeeper command by sending corresponding signals to the addressable multi-color LED strips to light up corresponding sections of the LED strips to identify the score. Each section of the LED strips includes one or more pixels.

In Example 10, the subject matter of Example 9 may optionally be configured such that the at least one scorekeeper command is further indicative of a number of points to win a game. The controller may be configured to implement the at least one scorekeeper command by sending corresponding signals to the addressable multi-color LED strips to indicate when the game has been won.

In Example 11, the subject matter of Example 10 may optionally be configured such that the at least one scorekeeper command is further indicative of a number of games to win a set. The controller may be configured to implement the at least one scorekeeper command by sending corresponding signals to the addressable multi-color LED strips to show the number of games to win the set, show a current number of games won by each player or team, and indicate when the set has been won.

In Example 12, the subject matter of any one or more of Examples 10-11 may optionally be configured such that the at least one scorekeeper command is further indicative of a selected game type from at least two different game types to score. The at least two different game types may include different scoring rules. The controller may be configured to implement the at least one scorekeeper command by sending corresponding signals to the addressable multi-color LED strips to indicate scores according to a corresponding scoring rule for the selected game type.

In Example 13, the subject matter of any one or more of Examples 1-12 may optionally be configured such that the user device may include a phone or tablet configured to wirelessly communicate with the controller.

In Example 14, the subject matter of any one or more of Examples 1-13 may optionally be configured such that wherein the user device includes a touchscreen monitor on or near the table, wherein the touchscreen monitor is configured communicate with the controller.

In Example 15, the subject matter of any one or more of Examples 1-14 may optionally be configured such that the lighting commands include a game command that is indicative of a color game. The controller is configured to implement the game command by sending corresponding signals to the addressable multi-color light strips to implement a process for the color game. The process for the color game may include lighting different pockets with different colors that are associated with different values, and scoring the color game according to values associated with the pocket in which a ball is hit.

In Example 16, the subject matter of any one or more of Examples 1-15 may optionally be configured such that the lighting commands include a game command that is indicative of a capture-the-hole game. The controller may be configured to implement the game command by sending corresponding signals to the addressable multi-color light strips to implement a process for the capture-the-hole game. The process for the capture-the-hole game lights pixels corresponding to each pocket with either a first color associated with a first player or first team or a second color associated with a second player or a second team. The user may be able to choose the color for a given one of the pockets wherein the color is associated with the first or second player or team who last hit a ball into the given one of the pockets. The color game is won when all pockets are associated with a same color.

Example 17 includes subject matter (such as a method) that may include placing corresponding ones of six LED strips on, in or near corresponding ones of six bumpers, and electrically connecting the LED strips in series. Each of the LED strips may include a plurality of LEDs and a plurality of addressable pixels. Each of the addressable pixels may include one or more of the plurality of LEDs. A controller may be connected to an end of the series-connected LED strips. The controller may be configured to send signals through the LED strips to control which one or more pixels are activated and one or more colors of light to be produced by the corresponding LEDs. A program may be implemented on a user device that is configured to communicate with the controller. The program may be implemented to enable a user of the user device to send lighting commands to the controller during gameplay. The lighting commands may be indicative of user-desired changes to lighting provided by the addressable multi-color LED strips. The controller may be configured to implement the commands by sending corresponding signals to the addressable multi-color LED light strips to implement the changes to the lighting.

In Example 18, the subject matter of Example 17 may optionally be configured such that the lighting commands include a call-your-shot command that is indicative of a selection of a pocket. The controller may be used to implement the call-your-shot command by sending corresponding signals to the addressable multi-color light strips to identify the selection of the pocket using an identifiable color for one or more pixels proximate to the pocket.

In Example 19, the subject matter of Example 18 may optionally be configured such that the selection of the pocket may be identified by lighting at least one pixel on each side of the pocket using the identifiable color.

In Example 20, the subject matter of any one or more of Examples 18-19 may optionally be configured such that a remainder of the pixels around the table correspond to another color different from the identifiable color.

In Example 21, the subject matter of any one or more of Examples 17-20 may optionally be configured such that the lighting commands include a pattern command that is indicative of a selection of a pattern. The controller may be used to implement the pattern command by sending corresponding signals to the addressable multi-color light strips to provide a temporal and spatial pattern of light along the addressable multi-color LED strips according to the selection.

In Example 22, the subject matter of any one or more of Examples 17-21 may optionally be configured such that the lighting commands include at least one scorekeeper command that is indicative of at least a score between two players or two teams. The controller may be used to implement the at least one scorekeeper command by sending corresponding signals to the addressable multi-color LED strips to light up corresponding sections of the LED strips to identify the score. Each section of the LED strips includes one or more pixels.

In Example 23, the subject matter of Example 22 may optionally be configured such that the at least one scorekeeper command is further indicative of a number of points to win a game. The controller may be used to implement the at least one scorekeeper command by sending corresponding signals to the addressable multi-color LED strips to indicate when the game has been won.

In Example 24, the subject matter of Example 23 may optionally be configured such that the at least one scorekeeper command is further indicative of a number of games to win a set. The controller may be used to implement the at least one scorekeeper command by sending corresponding signals to the addressable multi-color LED strips to show the number of games to win the set, a current number of games won by each player or team and indicate when the set has been won.

In Example 25, the subject matter of any one or more of Examples 22-24 may optionally be configured such that the at least one scorekeeper command is further indicative of a selected game type from at least two different game types to score. The at least two different game types may include different scoring rules. The controller may be used to implement the at least one scorekeeper command by sending corresponding signals to the addressable multi-color LED strips to indicate scores according to a corresponding scoring rule for the selected game type.

In Example 26, the subject matter of any one or more of Examples 17-25 may optionally be configured such that the user device is configured to wirelessly communicate with the controller. The user device may include a phone, tablet or remote control.

In Example 27, the subject matter of any one or more of Examples 17-26 may optionally be configured such that the user device includes a touchscreen monitor or a control device, with manual actuators, on or near the table. The touch screen monitor or the control device may be configured to communicate with the controller. The manual actuators for control device may include at least one of buttons, slides, or joysticks.

In Example 28, the subject matter of any one or more of Examples 17-27 may optionally be configured such that the lighting commands may include a game command that is indicative of a color game. The controller may be used to implement the game command by sending corresponding signals to the addressable multi-color light strips to light different pockets with different colors that are associated with different values, and score the color game according to values associated with the pocket in which a ball is hit.

In Example 29, the subject matter of any one or more of Examples 17-28 may optionally be configured such that the lighting commands include a game command that is indicative of a capture-the-hole game. The controller may be used to implement the game command by sending corresponding signals to the addressable multi-color light strips to implement a process for the capture-the-hole game. The process for the capture-the-hole game may be configured to light pixels corresponding to each pocket with either a first color associated with a first player or first team or a second color associated with a second player or a second team. The user may be able to choose the color for a given one of the pockets, where the color is associated with the first or second player or team who last hit a ball into the given one of the pockets, wherein the color game is won when all pockets are associated with a same color.

In Example 30, the subject matter of any one or more of Examples 17-29 may optionally be configured such that the placing addressable multi-color LED strips on a billiards table includes placing at least one diffuser along each bumper of the billiards table.

In Example 31, the subject matter of any one or more of Examples 17-30 may optionally be configured such that each diffuser has a geometrical shape of a triangular prism that is generally complementary to a profile of each of the six bumpers such that the diffusers may be positioned on a surface of the billiard table under the bumpers.

Example 32 includes subject matter (such as a method, means for performing acts, machine readable medium including instructions that when performed by a machine cause the machine to perform acts, or an apparatus to perform). The subject matter may be performed using addressable multi-color LED strips around a billiards table. The subject matter may include: implementing a program on a user device that is configured to communicate with the controller. the program may be implemented to enable a user of the user device to send lighting commands to a controller during gameplay. The lighting commands may be indicative of user-desired changes to lighting provided by the addressable multi-color LED strips. The subject matter may include implementing the commands using the controller by sending corresponding signals from the controller to the addressable multi-color LED light strips to implement the changes to the lighting. The corresponding signals may control which one or more pixels from a plurality of addressable pixels are activated.

In Example 33, the subject matter of Example 32 may optionally be configured such that the lighting commands include at least one of: a scorekeeper command for using light from the LED strips to indicate at least a score between two players or two teams; a game command for using light from the LED strips to play a color game or a capture-the-hole game; a pattern command for providing a temporal and spatial pattern of light along the addressable multi-color LED strips; or a call-your-shot command for using light from the LED strips to identify a selection of a pocket.

In Example 34, the subject matter of Example 33 may optionally be configured such that the call-your-shot command is implemented by using the controller to send corresponding signals to the addressable multi-color light strips to identify the selection of the pocket using an identifiable color for one or more pixels proximate to the pocket. The selection of the pocket may be identified using a static light pattern by providing, until another command is received or a timer expires, constant red, green and blue values to the same one or more pixels proximate to the pocket.

In Example 35, the subject matter of Example 33 may optionally be configured such that the call-your-shot command is implemented by using the controller to send corresponding signals to the addressable multi-color light strips to identify the selection of the pocket using an identifiable color for one or more pixels proximate to the pocket. The selection of the pocket may be identified, until another command is received or a timer expires, using an animated light pattern provided by: varying at least one of a red value, a green value or a blue value to the one or more pixels, or providing light to different ones of the one or more pixels proximate to the pocket.

In Example 36, the subject matter of any one or more of Examples 32-35 may optionally be configured such that the pattern command is implemented by using the controller to send corresponding signals to the addressable multi-color light strips to provide a spatial pattern of light along the addressable multi-color LED strips according to the selection and provide a temporal pattern for changing the spatial pattern of light over time. The spatial pattern may be provided by sending RGB values to one or more LED controllers associated with one or more pixels. The temporal pattern may be provided by varying at least one of a red value, a green value or a blue value to the one or more pixels, or providing light to different ones of the one or more pixels proximate to the pocket.

In Example 37, the subject matter of any one or more of Examples 32-36 may optionally be configured such that the at least one scorekeeper command is implemented by using the controller to send corresponding signals to the addressable multi-color LED strips to light up corresponding sections of the LED strips to identify the score. Each section of the LED strips may include one or more pixels. The at least one scorekeeper keeper command may be further indicative of a number of points to win a game, and the controller may be configured to implement the at least one scorekeeper command by sending corresponding signals to the addressable multi-color LED strips to indicate when the game has been won.

In Example 38, the subject matter of any one or more of Examples 32-37 may optionally be configured such that the at least one scorekeeper command is further indicative of a selected game type from at least two different game types to score. The at least two different game types include different scoring rules. The at least one scorekeeper command may be implemented by using the controller to send corresponding signals to the addressable multi-color LED strips to indicate scores according to a corresponding scoring rule for the selected game type.

In Example 39, the subject matter of any one or more of Examples 32-38 may optionally be configured such that the game command is for a color game and is implemented by using the controller to send corresponding signals to the addressable multi-color light strips to light different pockets with different colors that are associated with different values, and score the color game according to values associated with the pocket in which a ball is hit.

In Example 40, the subject matter of any one or more of Examples 32-39 may optionally be configured such that the game command is for a capture-the-hole game and is implemented by using the controller to send corresponding signals to the addressable multi-color light strips to light pixels corresponding to each pocket with either a first color associated with a first player or first team or a second color associated with a second player or a second team, wherein the user is able to choose the color for a given one of the pockets, the color being associated with the first or second player or team who last hit a ball into the given one of the pockets, and wherein the color game is won when all pockets are associated with a same color.

Example 41 includes subject matter (such as a kit for distribution to a user) that may include addressable multi-color LED strips, a system controller and connectors. The addressable multi-color LED strips may include at least a first LED strip for substantially spanning the known length, at least a second LED strip for substantially spanning the known length, at least a third LED strip for substantially spanning the known length, at least a fourth LED strip for substantially spanning the known length, at least a fifth LED strip for substantially spanning the known length, and at least a sixth LED strip for substantially spanning the known length. Each of the LED strips may include a plurality of LEDs and a plurality of addressable pixels. Each of the addressable pixels may include one or more of the plurality of LEDs. Each of the LED strips may include a plurality of addressable LED controllers to control a pixel of LEDS, a power conductor and a reference potential conductor connected to each of the plurality of addressable LED controllers, and a signal conductor serially connecting the plurality of addressable LED controllers. The system controller may be configured for use to provide control signals to the addressable multi-color LED light strips for controlling which one or more pixels are activated and one or more colors of light to be produced by the corresponding LEDs. The connectors are configured for use to connect the system controller to the at least the first LED strip, including connect a power output of the system controller to the power conductor of the at least the first LED strip, connect a reference potential output of the system controller to the reference potential conductor of the at least the first LED strip, and connect a signal output to the signal conductor of the at least the first LED strip; serially connect the at least the first and the at least the second LED strips, including connect the power conductors together, connecting the reference potential conductors together and connecting the signal conductors together; serially connect the at least the second and the at least the third LED strips, including connect the power conductors together, connecting the reference potential conductors together and connecting the signal conductors together; serially connect the at least the third and the at least the fourth LED strips, including connect the power conductors together, connecting the reference potential conductors together and connecting the signal conductors together; serially connect the at least the fourth and the at least the fifth LED strips, including connect the power conductors together, connecting the reference potential conductors together and connecting the signal conductors together; and serially connect the at least the fifth and the at least the sixth LED strips, including connect the power conductors together, connecting the reference potential conductors together and connecting the signal conductors together.

In Example 42, the subject matter of Example 41 may optionally be configured to further include an adhesive for applying the addressable multi color LED strips to a surface.

In Example 43, the subject matter of Example 42 may optionally be configured such that the adhesive includes adhesive strips on the addressable multi-color LED strips.

In Example 44, the subject matter of Example 41 may optionally be configured to further include diffusers. Each of the diffusers may have a length corresponding to lengths of the addressable multi-color LED strips. The diffusers are configured to diffuse light from the corresponding LED strips.

In Example 45, the subject matter of Example 44 may optionally be configured such that each diffuser has a geometrical shape of a triangular prism that is generally complementary to a profile of each of the six bumpers such that the diffusers may be positioned on a surface of the billiard table under the bumpers.

In Example 46, the subject matter of any one of Examples 44-45 may optionally be configured such that the diffusers are fabricated from a polycarbonate material.

In Example 47, the subject matter of any one of Examples 44-46 may optionally be configured such that the diffusers include six diffusers. Each of the six diffusers may substantially span the known length of the bumpers.

In Example 48, the subject matter of any one of Examples 44-46 may optionally be configured such that the diffusers include at least two diffusers for each of the six bumpers. The at least two diffusers may substantially span the known length of the bumpers.

In Example 49, the subject matter of Example 48 may optionally be configured such that the addressable multi-color LED strips include at least two LED strips for each of the six bumpers, each of the at least two LED strips substantially spanning a diffuser length.

In Example 50, the subject matter of any one of Examples 48-49 may optionally be configured such that the diffuser is formed around to encase the corresponding LED strip. The at least two diffusers may be configured with plug and socket connectors for making electrical connections between the at least two LED strips.

In Example 51, the subject matter of any one of Examples 41-50 may optionally be configured to further include adhesive (e.g., adhesive strips) for applying the diffusers to a surface.

In Example 52, the subject matter of any one of Examples 41-51 may optionally be configured to further include a power source. The power source may include a plug-in power source or a rechargeable battery.

In Example 53, the subject matter of any one of Examples 41-52 may optionally be configured to further include a downloadable app configured to be implemented on a user device. The user device may be configured to wirelessly communicate with the system controller, and the app implemented on the user device may be configured to enable a user of the user device to send lighting commands to the controller during gameplay. The lighting commands may be indicative of user-desired changes to lighting provided by the addressable multi-color LED strips. The controller may be configured to implement the commands by sending corresponding signals to the addressable multi-color LED light strips to implement the changes to the lighting.

This Summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

The present subject matter provides user-interaction with LEDs to enhance the game of billiards for players of all abilities. The LEDs may assist and/or guide the players to a more enjoyable and entertaining game. It not only brings LED lights specifically fit for a billiards table, but also provide an attractive system with modes or functions specific to the game of billiards. It combines the eye-catching appeal of LED lights with the fun of new ways to play pool and interaction between the player and the table. It gives business owners the ability to highlight their beautiful tables and attract more players and business, and can excite families to regularly use their pool table given its many possible customizations.

Figure 1:
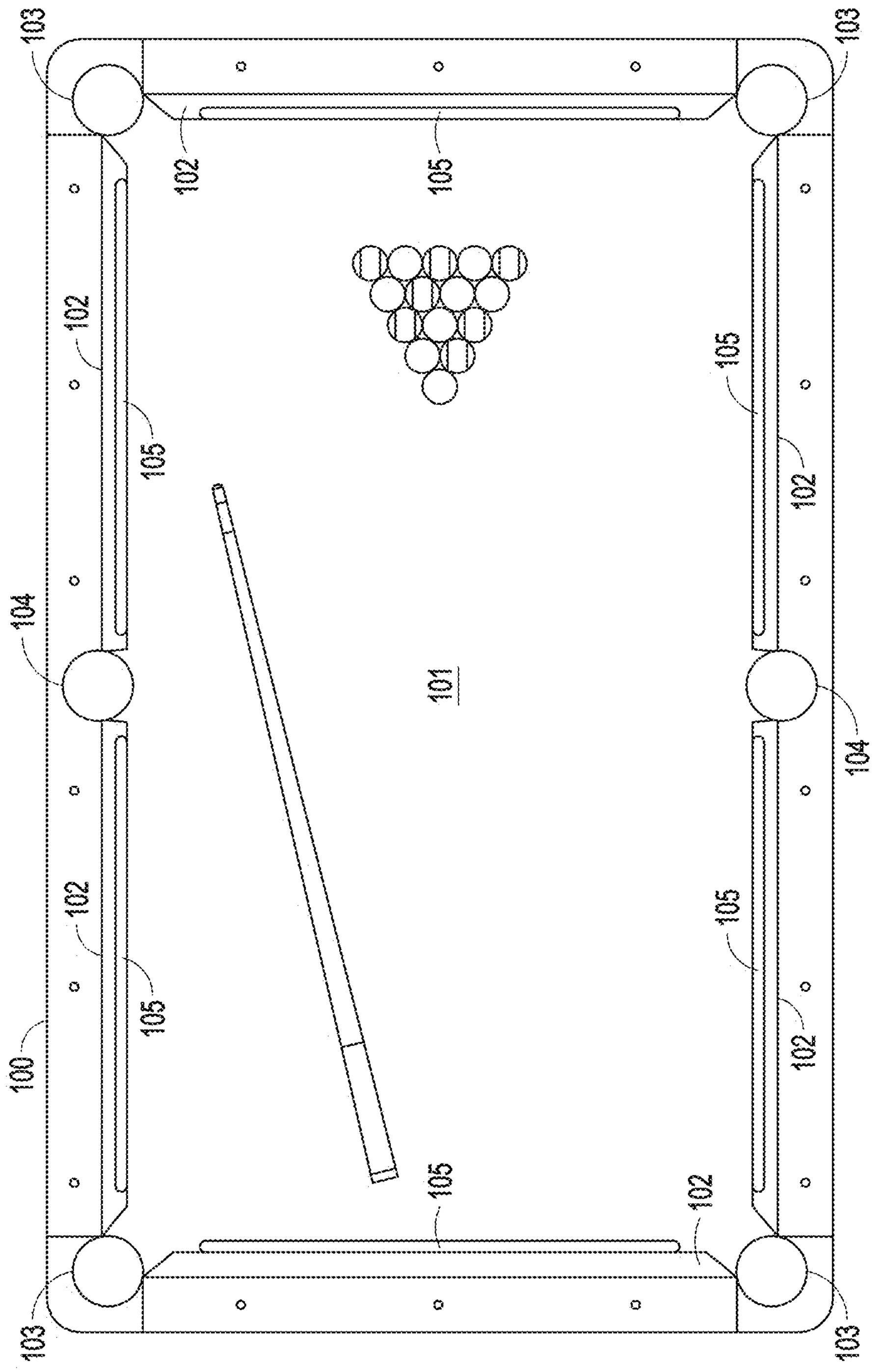
FIG. 1 illustrates, by way of example and not limitation, a billiards table with addressable multicolor LED strips placed along each bumper of the table.

FIG. 1 illustrates, by way of example and not limitation, a billiards table with addressable multicolor LED strips placed along each bumper of the table. The billiards table 100 includes a playing surface 101, six bumpers 102, four corner pockets 103 and two side pockets 104. FIG. 1 also illustrates six addressable multicolor LED strips 105 positioned along the six bumpers 102, respectively. The addressable multicolor LED strips have a length corresponding to a length of a bumper of the billiards table, such that the strips substantially run along the length of the bumper. For example, a seven foot table may have six equal bumper lengths of about 33 inches each. The length of each addressable multicolor LED strip may be about 33 inches or slightly less such as, for example and not limitation, within a range of 30-33 inches. An eight foot table may have six equal bumper lengths of about 38 inches each. The length of each addressable multicolor LED strip may be about 38 inches or slightly less such as, for example and not limitation, within a range of 35-38 inches. A nine foot table may have six equal bumper lengths of about 43 inches each. The length of each addressable multicolor LED strip may be about 43 inches or an inch or slightly less such as, for example and not limitation, within a range of 40-43 inches. The LED strips may have a length to fit seven foot oversized tables that are slightly bigger than the seven foot tables, or a length to fit eight foot oversized tables that are slightly bigger than the eight foot tables. As will be discussed in more detail below, each of the strips include a plurality of LEDS, and the plurality of LEDs may include red, green and blue LEDs (e.g., RGB LEDs) that can be controlled to produce a large variety of colors. Furthermore, the strips include LED controllers that can be independently addressed. Each of the LED controllers control a pixel of LEDs, such as three groups of RGB LEDs in an embodiment. However, other addressable multicolor LED strips may have each LED controller control a pixel of one RGB LED group, or have each LED controller control a pixel of two groups of RGB LEDs. Additionally, an addressable pixel may correspond to four or more groups of RGB LEDs.

Figure 2:
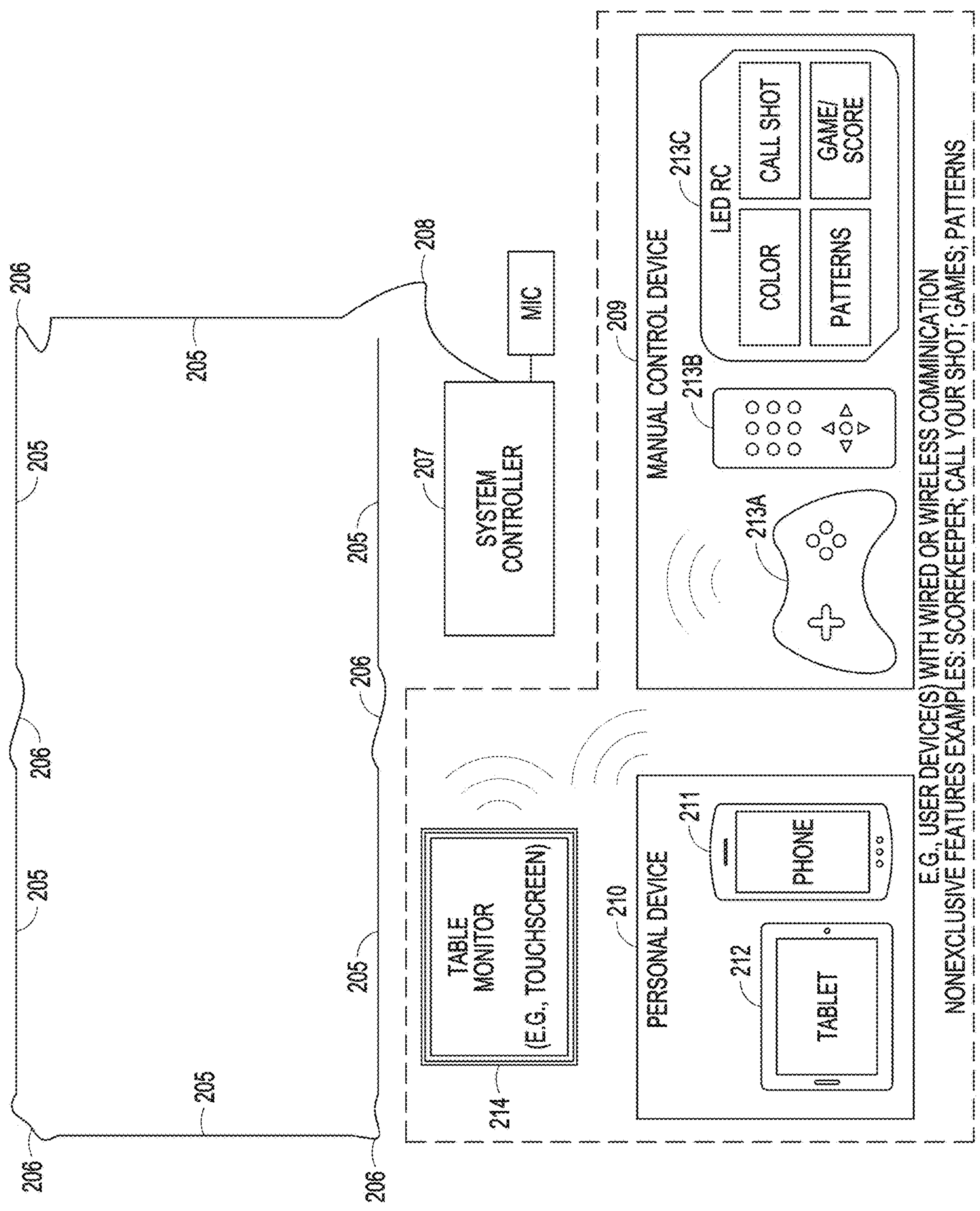
FIG. 2 illustrates, by way of example and not limitation, a system according to various embodiments of the present subject matter.

FIG. 2 illustrates, by way of example and not limitation, a system according to various embodiments of the present subject matter. The illustrated system includes six addressable multicolor LED strips 205 that are connected in series using flexible electrical connections 206 (e.g., individual wires or cables, and plug/socket connectors). By way of example, the wire may be 20 AWG wire cut into strips of about six inches. The system further includes a system controller 207 that is configured to power the LED strips and send signal packets to LED controllers to control corresponding pixels of RBG LEDs. The system controller 207 is configured to address control signals to individual ones of the LED controllers in any of the addressable multicolor LED strips 205. A longer flexible connection 208 may be provided between an end of one of the LED strips 205 and the system controller 207. The system further includes one or more user devices 209 that may be configured to communicate with system controller over a wireless or wired connection. The user devices 209 may include a personal device 210 such as a smart phone 211 or a tablet 212 that is configured to communicate with the controller. In an embodiment, the controller is configured to wirelessly communicate with the smart phone or tablet. For example, the wireless communication may be through Bluetooth or through a wireless network (e.g., WLAN). In some embodiments, the user device may include a manual controller such as a game controller 213A or a remote control such as a remote control similar to a TV remote control 213B or an LED remote control device 213C. The manual controller may be referred to as a control device with manual actuators. The manual actuators may include at least one of button(s), slide(s), or joystick(s). The LED remote control device may be specifically configured to work with an addressable multicolor LED strip. By way of example and not limitation, the LED remote control may have an array of color buttons, where each color button corresponds to a preset color (e.g., RGB value), may have UP and DOWN buttons to increase values for RED, GREEN and/or BLUE from the preset color, and may have various buttons that correspond to different patterns to be selected, may have pocket numbers for the call-your-shot feature, and may have scoring buttons for scoring games and/or sets.

The manual controller (or analog controller) may communicate with the system controller over a wired connection, or may wirelessly communicate with the system controller. In some embodiments, the user device 209 may include a table monitor 214 that is more permanently associated with the table. For example, the table monitor may be a monitor mounted to a side of the table. Some user interface may use touch screens (e.g., phone, tablet, and/or table monitor). Other user interfaces are contemplated, including keyboards, joystick, knobs, buttons, and the like. The user interface is configured for use to allow a user to control one or more features of the present subject matter, such as a Scorekeeper feature, a call-your-shot feature, a Game feature, and/or a Patterns feature. User interfaces for use with these and other features are discussed in more detail below with respect to a downloadable app for a smart phone.

Figure 3:
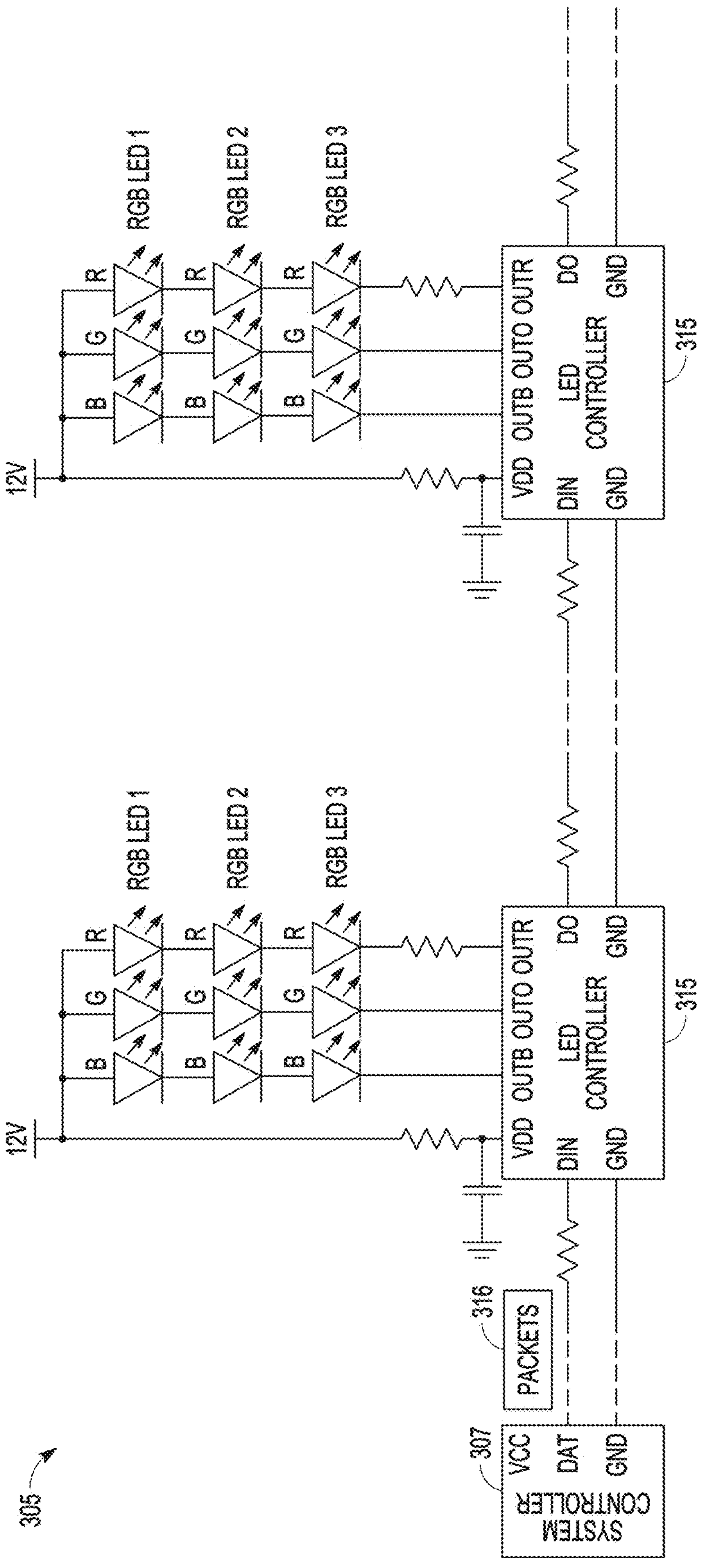
FIG. 3 illustrates, by way of example and not limitation, a schematic for a portion of an addressable multicolor LED strip.

FIG. 3 illustrates, by way of example and not limitation, a schematic for a portion of an addressable multicolor LED strip. The LED strip 305 is directly, or indirectly through other LED strips, connected to a system controller 307. Each LED strip 305 includes a plurality of LED controllers 315, and each LED controller 315 is connected to at least one RGB LED. Each RGB LED includes a red LED, a green LED and a blue LED. In the illustrated embodiment, each LED controller is configured to control current flow through three RGB LEDs, such that one pixel is formed from three RGB LEDs. The relative current flow among red, green and blue LEDs will control the perceived color of the pixel. The system controller 307 sends digital packets 316 on a data line to individually control the LED controllers to provide the desired current flow the red, green and blue components of the RBG LEDs.

Figure 4:
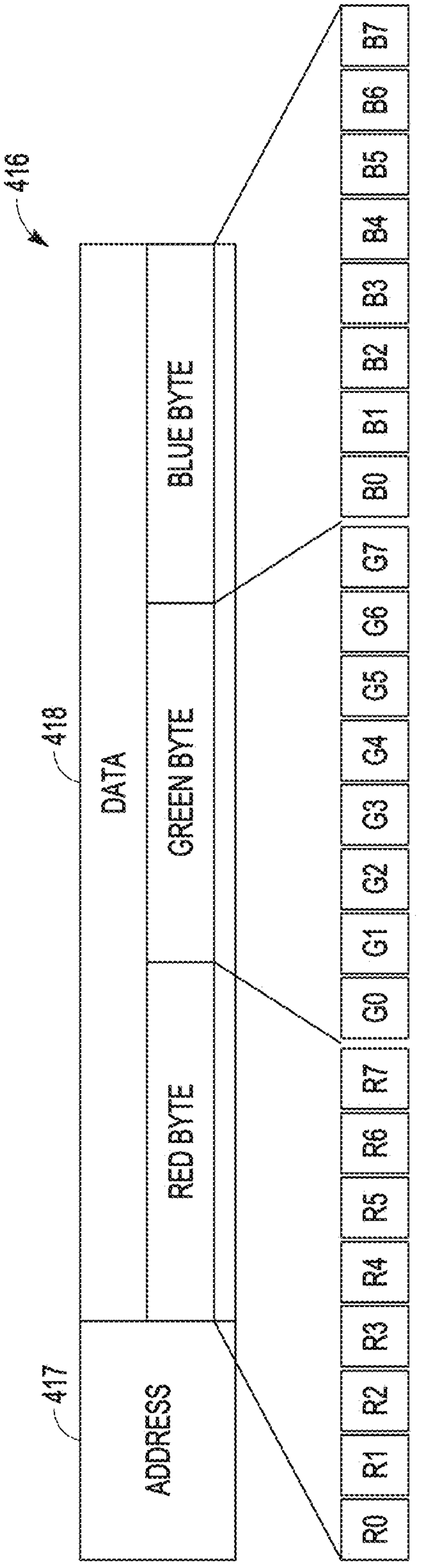
FIG. 4 illustrates, by way of example and not limitation, a digital packet, including control information (e.g., address) and data payload, used to control the addressable multicolor LED strips.

FIG. 4 illustrates, by way of example and not limitation, a digital packet, including control information (e.g., address) and data payload, used to control the addressable multicolor LED strips. A digital packet 416 includes control information, which includes an address 417 such that individual ones of the LED controllers (315 in FIG. 3) can be addressed. These individually-controlled LED controllers may be referred to as pixels of the LED strip. For example, an 8-bit ("byte") address can individually control 256 (28) LED controllers. Each digital packet sent to an individual one of the LED controllers includes control data 418 (which also may be referred to as "payload") for controlling the red LEDs, the green LEDs, and the blue LEDs. In the illustrated embodiment, the data may include a red byte of data, a blue byte of data, and a green byte of data. Thus, in this embodiment, each of the red, green and blue control data include 8 bits (R0-R7, G0-G7, and B0-B7), thereby providing 256 levels (28) of current through the LEDs ranging from OFF (no current) to a maximum current draw.

Figure 5:
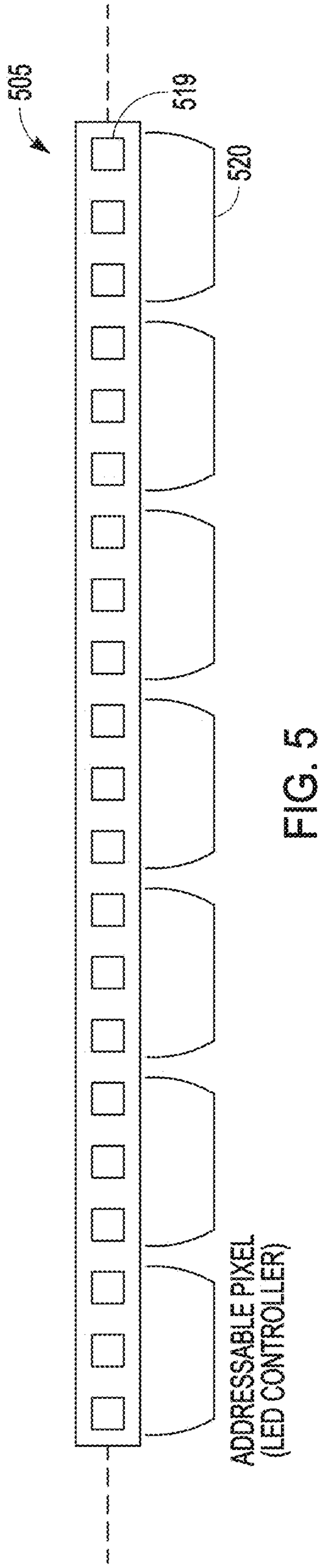
FIG. 5 illustrates, by way of example and not limitation, a length of an addressable multi-color LED strip organized into addressable pixels.

FIG. 5 illustrates, by way of example and not limitation, a length of an addressable multi-color LED strip organized into addressable pixels. The illustrated LED strip 505 includes a plurality of RGB LEDs 519, where each RGB LED includes a red led, a green led and a blue led. In the embodiment illustrated in FIG. 3, each LED controller is configured to control three RGB LEDs. Thus, three RGB LEDs 519 correspond to an individually-controllable pixel 520 of the LED strip 505.

Figure 6:
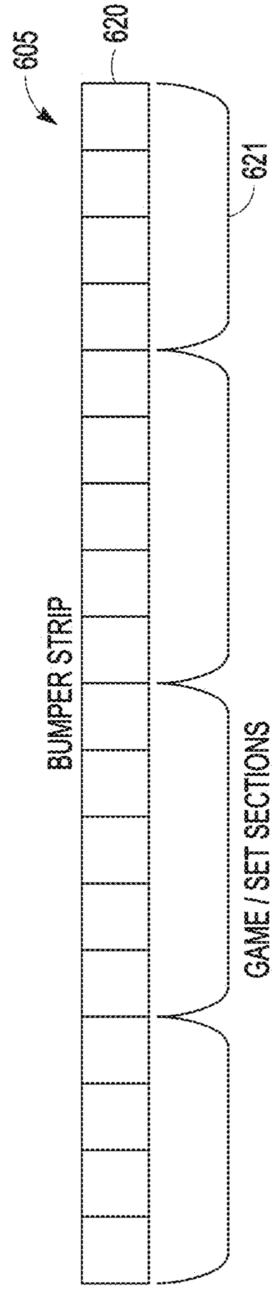
FIG. 6 illustrates, by way of example and not limitation, a length of an addressable multi-color LED strip, where addressable pixels are organized into scoring sections.

FIG. 6 illustrates, by way of example and not limitation, a length of an addressable multi-color LED strip, where addressable pixels are organized into addressable multicolor LED strip. The illustrated LED strip 605 includes a plurality of individually-controllable pixels 620 that are themselves grouped into game/set sections 621 for use in keeping score in one or more types of billiard games. In the illustrated embodiment, each game or set section corresponds to four individually-controllable pixels. Other embodiments may use more or fewer pixels for the game or set sections. Furthermore, some embodiments may use the same number of pixels in each game/set section, and some embodiments may use different numbers of pixels in different game/set sections.

Figure 7:
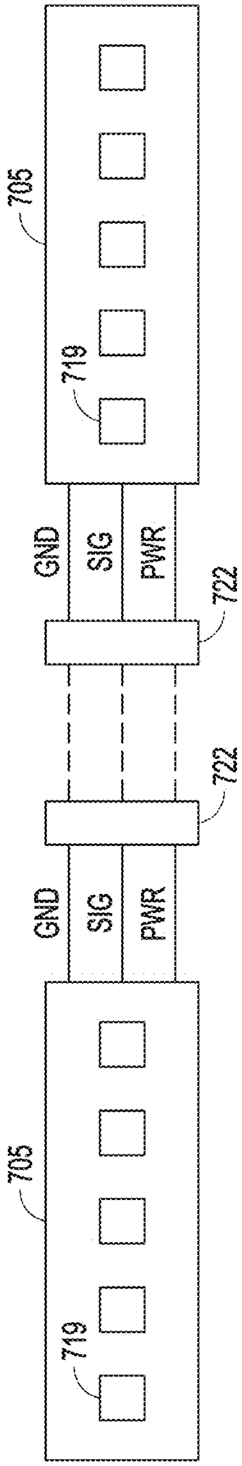
FIG. 7 illustrates, by way of example and not limitation, an embodiment for serially-connecting multi-color LED strips.

FIG. 7 illustrates, by way of example and not limitation, an embodiment for serially-connecting multi-color LED strips. Schematics for end portions of two LED strips 705 is shown, along with RGB LEDs 719 in the LED strips 705. Each end may include three conductors between the strip and a connector. The three conductors may correspond to a power conductor, a reference or ground conductor, and a signal conductor over which the digital packets are sent. The connectors 722 are configured to make a secure connection between the two LED strips. For example, the connectors 722 may include a plug and socket configuration in which the plug securely fits within the socket to make the electrical connection.

Figure 8B:
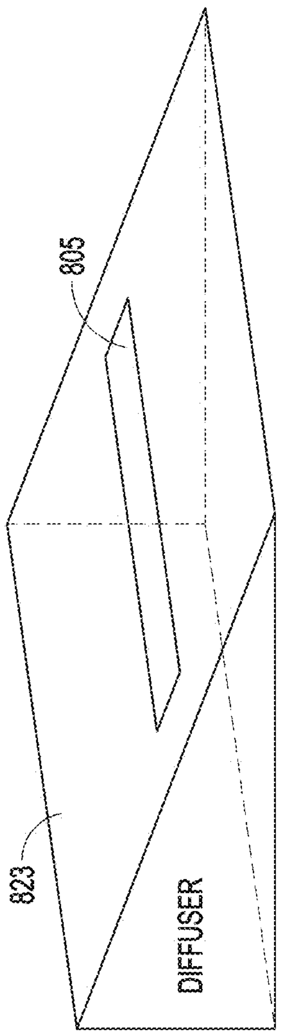
FIGS. 8A-8E illustrate, by way of example and not limitation, profile views of a diffuser and a billiard table bumper to show a generally complementary relationship between the diffuser and the billiard table bumper.
Figure 8D:
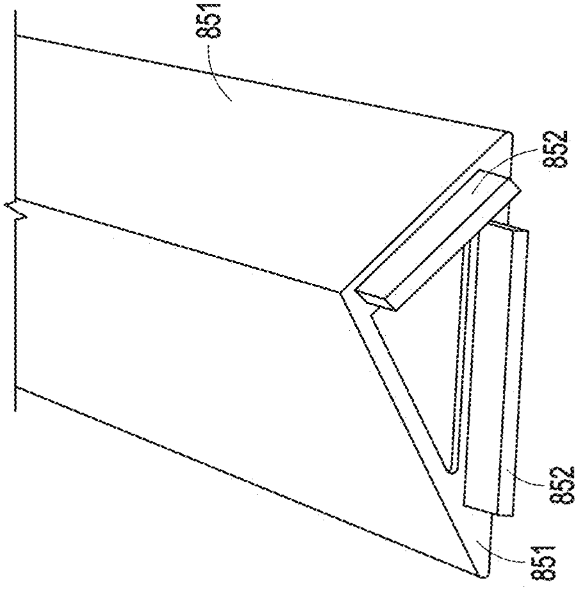
Figure 8A:
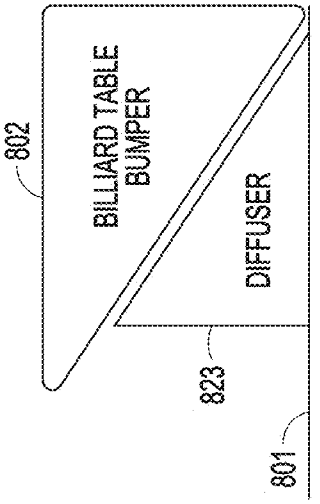

FIG. 8A illustrates, by way of example and not limitation, profile views of a diffuser and a billiard table bumper to show a generally complementary relationship between the diffuser and the billiard table bumper. The LEDs may be undesirably bright. Thus, some embodiments may include a diffuser 823. Each diffuser may be configured with an opening through which an LED strip may be inserted, allowing the diffuser to hold the LED strip. Alternatively, each diffuser may be fabricated around the LED strip to form a unit. In a particular embodiment, the diffuser 823 may have length that generally corresponds to the length of the LED strips 805 (which generally corresponds to the length of a bumper). Alternatively, the diffusers may be sized so that more than one diffuser, lined end-to-end, are used to substantially span the length of a bumper. In some embodiments in which more than one diffuser is used to span the length of a bumper, more than one LED strip may be used such that each diffuser corresponds to one LED strip. In embodiments in which more than one diffuser is used to span the length of a bumper and the diffusers are fabricated around a respective LED strip, the diffusers may have an electrical connection to facilitate an electrical connection between the LED strips and may have a mechanical connection to facilitate a secure alignment between diffusers that have been assembled end-to-end. By way of example and not limitation, plug and socket connectors may be used for both the electrical and mechanical connections. Furthermore, the diffuser may be sized and configured for placement on the playing surface 801 of the billiard table alongside and beneath one of the bumpers 802, such as illustrated in FIG. 8. The geometrical shape of the diffuser may be that of a triangular prism. The triangular prism has triangular ends and three rectangular sides. The geometrical shape is generally complementary to a profile of each of the six bumpers such that the diffusers may be positioned on a surface of the billiard table under the bumpers. By way of example and not limitation, the diffusers may be fabricated from a polycarbonate material. The diffusers may be configured with a void to securely hold the LED strip in a desired orientation. In some embodiments, each of the rectangular sides of the diffusers have a generally uniform thickness, and the LED strips may be adhered, via the adhesive strip on the LED strip, to an interior side of one of the rectangular sides. In some embodiments, only two of the rectangular sides have material, and the third side is open through which the LED strip may be placed (e.g., on the inside surface of the bottom rectangular side). Some embodiments may use an adhesive-like strip on an exterior of the diffuser to help in maintaining position of the diffuser against a bumper. Some embodiments may attach the LED strips to an exterior of the diffuser, where the LED strips or oriented to pass light through the diffuser.

Figure 8C:
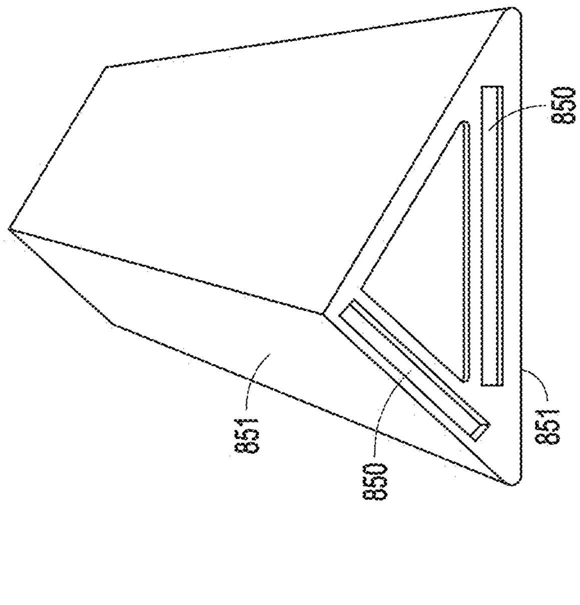
Figure 8E:
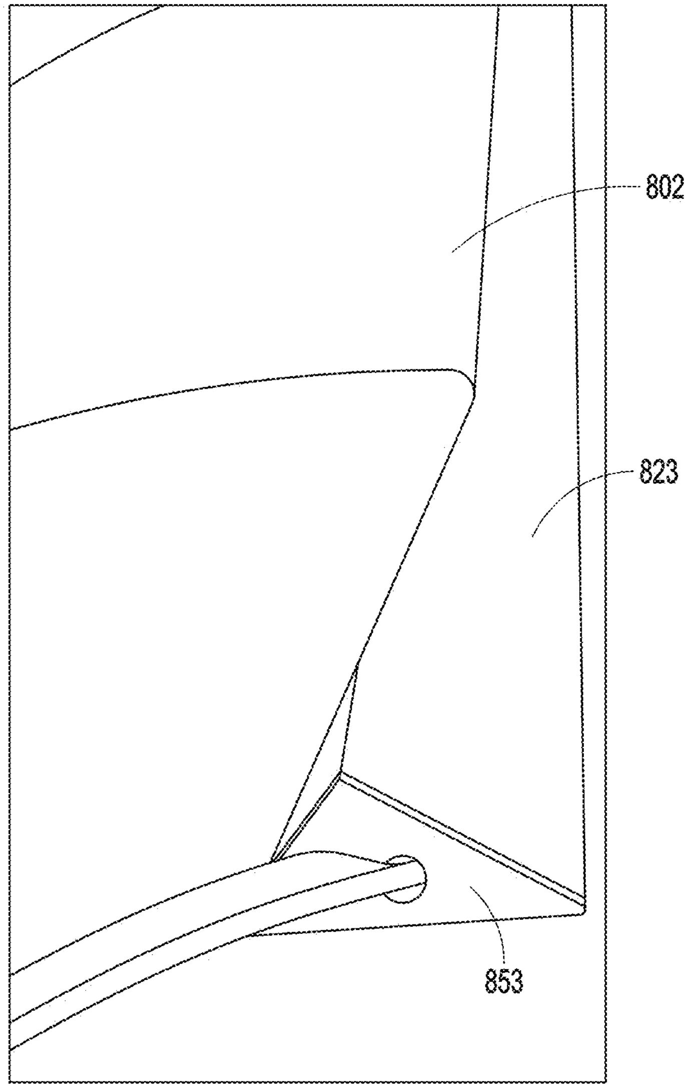

FIG. 8B illustrates, by way of example and not limitation, a perspective view of a diffuser 823 and an addressable multicolor LED strip 805 inside of the diffuser 823. Some kit embodiments provide the diffuser 823 with the corresponding LED strip already positioned inside of the diffuser, such as when the diffuser is fabricated around the LED strip. FIGS. 8C and 8D illustrate a diffuser embodiment in which smaller diffusers may be pieced together to form a longer diffuser. One end of the diffuser may one or more slots 850 formed in at least some of the diffuser sidewalls 851, and the other end of the diffuser may have one or more corresponding tabs 852 extending from the diffuser sidewalls 851. The tab(s) 852 are configured to fit within the slots 850 of another diffuser. FIG. 8E illustrate an end view of a diffuser slid against a bumper 802, with an end cap 853 attached to the diffuser 823. Wiring may extend through an opening in the end cap. The end cap 853 may be fabricated with a tab or a groove to fit within a corresponding groove or tabs in the diffuser 823.

Figure 9B:
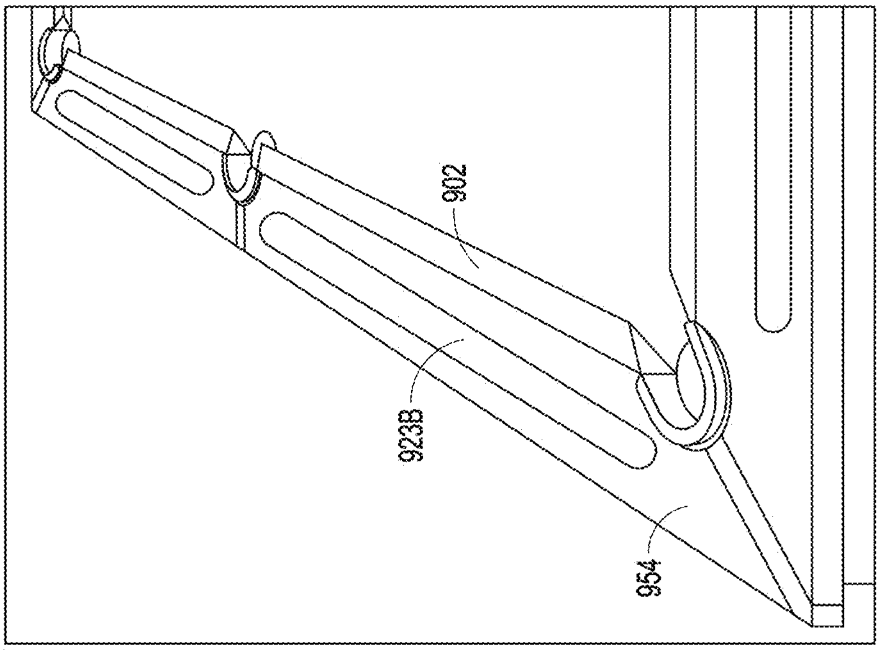
FIGS. 9A-9B illustrate, by way of example and not limitation, table top diffusers and in-table diffusers, respectively.
Figure 9A:
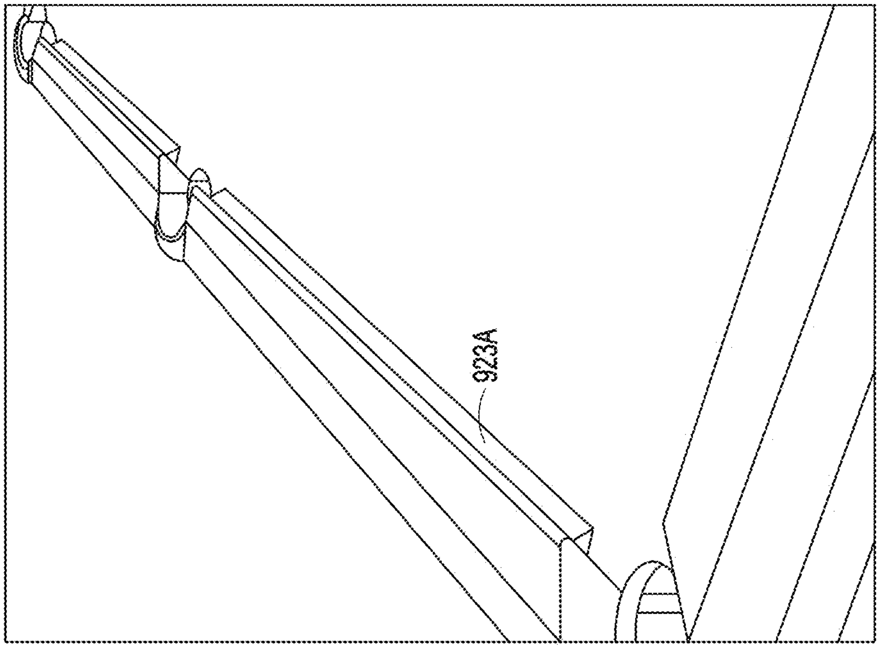

FIGS. 9A-9B illustrate table top diffusers and in-table diffusers, respectively. The table-top diffusers 923A (FIG. 9A) may be slid on the playing surface of the pool table underneath the bumpers to keep them out of the way during play. The in-table diffusers 923B may be built into the table (e.g., built into the rail 954 behind the bumpers 902). For example, a groove may be routed into the rails, the LED strips may be installed within the groove, and diffuser may be placed over the LED strip. The in-table diffusers 923B may be easier for competitive players to play pool without being unnecessarily distracted by the lights, as the lights in the table are not in the direct line of sight for the players. The table-top diffusers 923B are more easily added to an existing table by sliding under the bumpers, and removed if a user desires to return to a more traditional looking table for some occasions.

Figure 10:
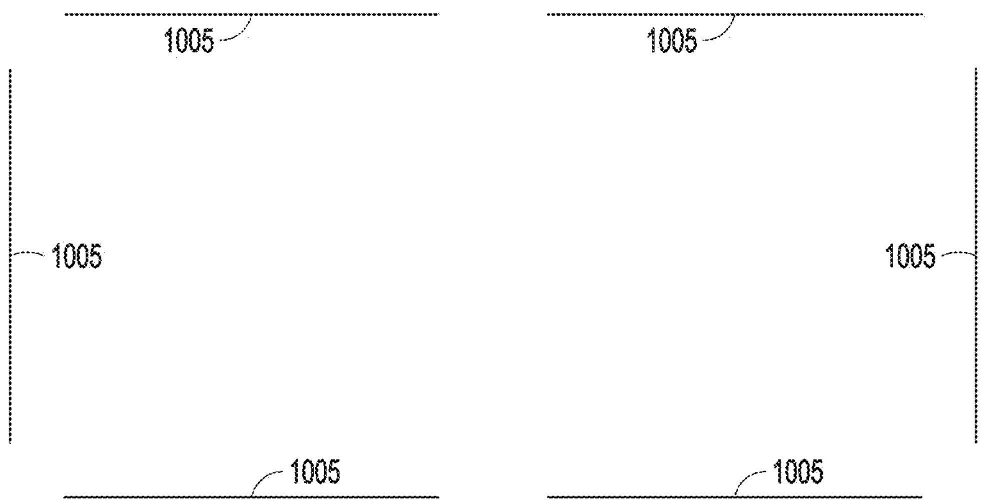
FIG. 10 illustrates, by way of example and not limitation, a system that includes six addressable multicolor LED strips that have lengths to generally correspond to the lengths of the six bumpers of the billiards table.

FIG. 10 illustrates, by way of example and not limitation, a system that includes six addressable multicolor LED strips that have lengths to generally correspond to the lengths of the six bumpers of the billiards table. By way of example and not limitation, these strips may be inserted into a diffuser as discussed above with respect to FIGS. 8 and 9.

Figure 11:
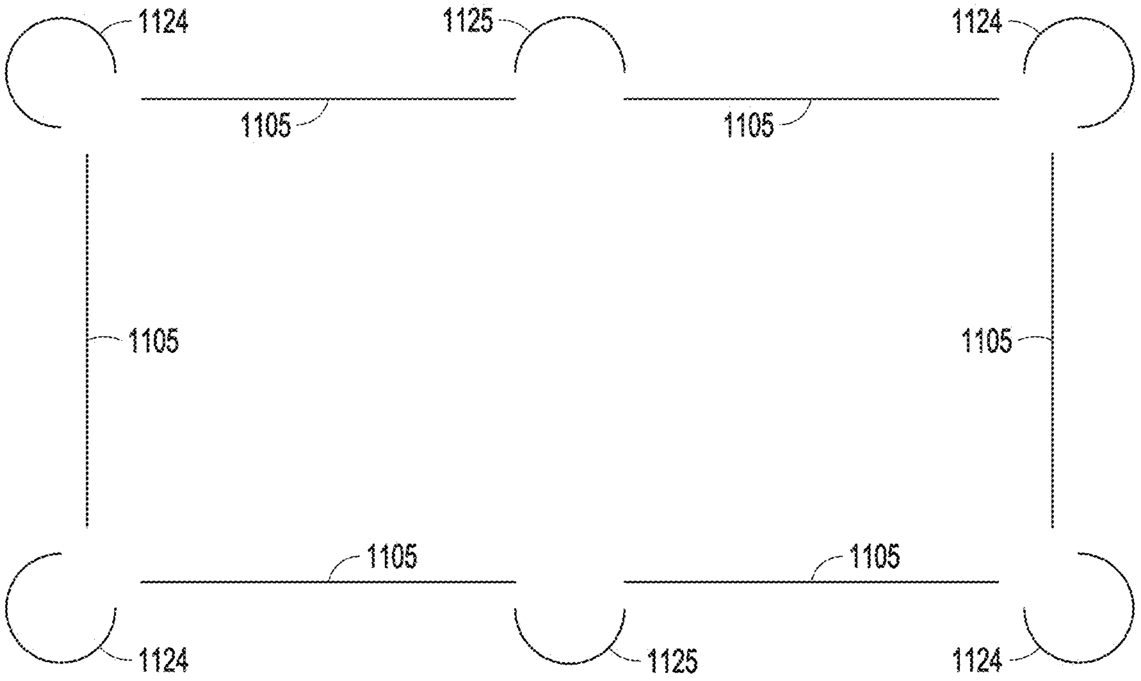
FIG. 11 illustrates, by way of example and not limitation, the system illustrated in FIG. 10 that further includes addressable pocket LED strips.

FIG. 11 illustrates, by way of example and not limitation, the system illustrated in FIG. 10 that further includes addressable pocket LED strips. Thus, additional strips may be used to provide LEDs around each pocket. For example, four strips 1124 may be cut to a defined length for each corner pocket to go around about 270 degrees of the corner pocket, and two strips 1125 may be cut to a defined length for each side pocket to go around about 180 degrees of the side pocket. These pocket LED strips may be connected in series with the other strips. The discussion that follows will be directed toward the system that only has the six bumper LED strips illustrated in FIG. 10. It is also noted that some embodiments may use only the pocket LED strips. For example, a system for implementing a "call-your-shot" feature may only use pocket LED strips to identify the hole selection.

Figure 12:
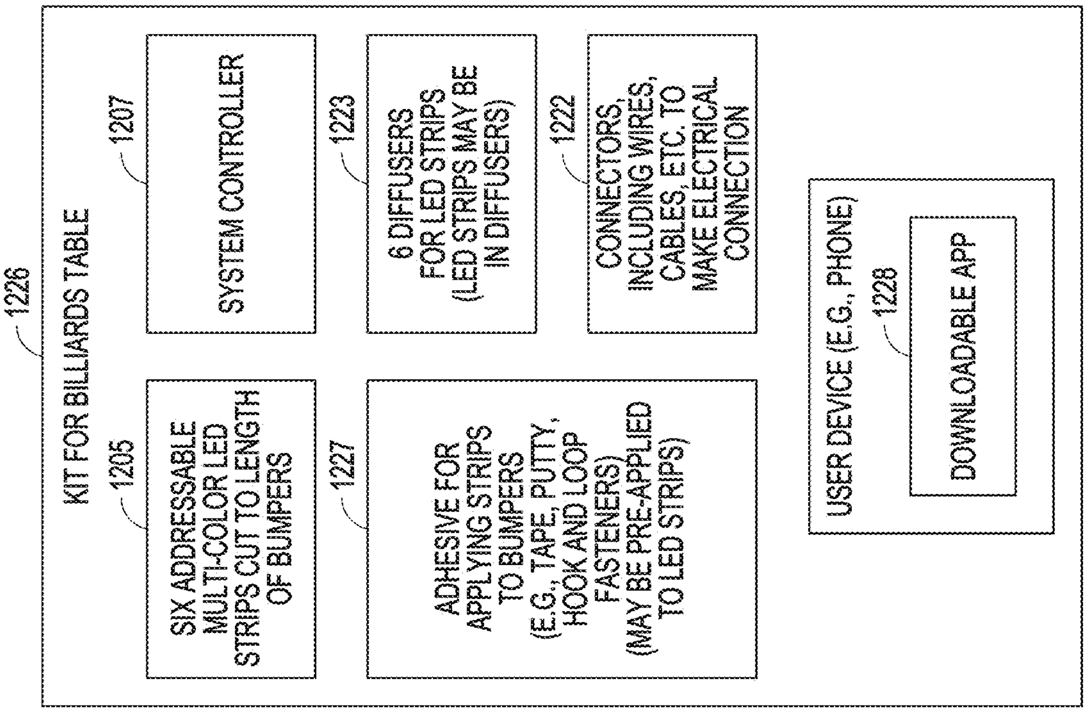
FIG. 12 illustrates, by way of example and not limitation, a kit for installing and using the present subject matter to enhance billiard gameplay.

FIG. 12 illustrates, by way of example and not limitation, a kit for installing and using the present subject matter to enhance billiard gameplay. The illustrated kit 1226 may be for a billiards table having six bumpers of a known length. The kit may include six addressable multi-color LED strips 1205 including a first LED strip, a second LED strip, a third LED strip, a fourth LED strip, a fifth LED strip and a sixth LED strip. Each of the LED strips may have a length corresponding to the known length to extend substantially along of length of a bumper. Each of the LED strips include a plurality of addressable LED controllers to control a pixel of LEDS, a power conductor and a reference potential conductor connected to each of the plurality of addressable LED controllers, and a signal conductor serially connecting the plurality of addressable LED controllers. The kit may further include a system controller 1207 configured for use to provide control signals to the addressable multi-color LED light strips for controlling which one or more pixels are activated and one or more colors of light to be produced by the corresponding LEDs. The kit may further include connectors 1222 (and associated wiring, cables, etc. to make the electrical connection) configured for use to connect the system controller to the first LED strip, including connect a power output of the system controller to the power conductor of the first LED strip, connect a reference potential output of the system controller to the reference potential conductor of the first LED strip, and connect a signal output to the signal conductor of the first LED strip, serially connect the first and second LED strips, including connect the power conductors together, connecting the reference potential conductors together and connecting the signal conductors together, serially connect the second and third LED strips, including connect the power conductors together, connecting the reference potential conductors together and connecting the signal conductors together, serially connect the third and fourth LED strips, including connect the power conductors together, connecting the reference potential conductors together and connecting the signal conductors together, serially connect the fourth and fifth LED strips, including connect the power conductors together, connecting the reference potential conductors together and connecting the signal conductors together, and serially connect the fifth and sixth LED strips, including connect the power conductors together, connecting the reference potential conductors together and connecting the signal conductors together.

The kit may include a separate adhesive 1227 for applying the six addressable multi color LED strips to a surface. In some embodiments, each of the LED strips includes an adhesive strip for use to attach the LED strips to a surface. The kit may include adhesives for the diffusers for applying the diffusers to a surface.

Some kit embodiments further include six diffusers 1223 configured to diffuse light from the LED strips. For example, the diffusers may be configured for the LED strips to be inserted therein. In some embodiments, the LED strips are within the diffusers in the kit. Each of the diffusers having a length corresponding to the known length, wherein the six diffusers have an open end and are configured with an interior to hold the six LED strips, respectively.

The kit may further include a downloadable app configured to be implemented on a user device that is configured to wirelessly communicate with the system controller. The app implemented on the user device is configured to enable a user of the user device to send lighting commands to the controller during gameplay. The lighting command may be indicative of user-desired changes to lighting provided by the addressable multi-color LED strips, and the controller is configured to implement the commands by sending corresponding signals to the addressable multi-color LED light strips to implement the changes to the lighting. The kit may include a table monitor, and/or a manual controller such as but not limited to a gaming controller.

The system controller may be a microcontroller embedded on a board with 12 v input, 12 v output, 5 v output, and one signal input and one signal output pin. The kit may include a 12 v AC/DC Power Adapter and/or a 12V rechargeable battery, a sound detector, and wire screw on connectors. The kit may include instructions for setting up the system and/or operating the system. The 12 v AC/DC adapter may be plugged into a power outlet and into the board to give the system power. After this, the phone application may be opened on the phone and connected to the board. From this, the user can control the system. The user can, through the phone application, control which mode the system is in and if the sound sensor should be used. This control is done by the application sending bytes to the microcontroller through Bluetooth, BLE, or Wi-Fi. If a sound-activated mode is selected by the user, the microcontroller will read data sent by the sensor and use that data to determine when and/or the lights should be illuminated. The microcontroller controls the lights by sending commands along the data line of the strips through the data output line. It, by command of the app, controls which specific strips and which parts of the strips illuminate, and how they illuminate. The wires and wire screws connect and led strips to each other and allow power to be transferred in series and one continuous data line. Components can be interchanged or replaced to perform an identical function as stated in the next section. Sensors in the holes or on the table, such as but not limited to force sensing resistors (a variable resistance force sensor) or light-sensitive sensors, can be added to give the microcontroller more data to control the lights. An example of an on-the table sensor includes sensors in or on the diffusers near the end of the diffuser. Thus, sensors can be positioned on opposing sides of the pocket, and can be configured to sense when a ball goes past the sensors into the hole.

Other sensor examples include RFID sensing and optical sensing using cameras/light sensors. For example, the balls may be configured to include RFID chips. RFID readers, configured to read the RFID chips, may be positioned at the end of the diffusers or in the table (e.g., near the pockets), in the pocket, or adjacent to or in the pocket. When a ball drops, the RFID reader may read which chip fell in to the pocket, may send a signal to the controller, and the controller uses that information to run a feature and control the lights. An optical example using a camera and lighting example may use cameras or light sensors at the end of the diffusers or in or adjacent to the pocket to tell when a ball is shot into a pocket and which ball fell into the pocket.

Some examples of the present subject matter may be configured to interact with Internet Of Things (IOT) devices. IOT devices may be embedded with sensors and software to connect with other devices using the internet. For example, a cloud-based voice service may be accessed to enable players to use voice commands (e.g., "pocket 6") to interact with the system. Voice commands may be a relatively easy way to interact with the system during game play (e.g., when a player is lining up the next shot).

Figure 13:
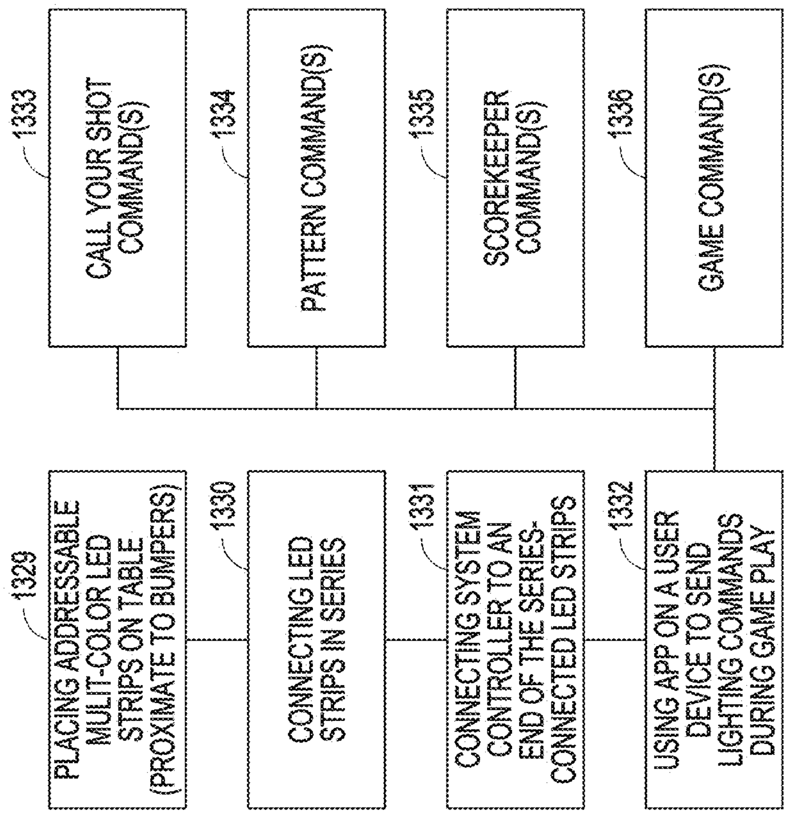
FIG. 13 illustrates, by way of example and not limitation, a method for setting up and using the present subject matter.

FIG. 13 illustrates, by way of example and not limitation, a method for setting up and using the present subject matter. The method may include placing addressable multi-color LED strips on a billiards table 1329, including placing corresponding ones of six LED strips on or near corresponding ones of six bumpers. The LED strips may be in a diffuser, which may be placed on the playing surface adjacent to and underneath the bumper. Each the LED strips are electrically connected in series 1330. Each of the LED strips includes a plurality of LEDs and a plurality of addressable pixels, and each of the addressable pixels includes one or more of the plurality of LEDs. A system controller may be connected to an end of the series-connected LED strips 1331. The controller is configured to send signals through the LED strips to control which one or more pixels are activated and one or more colors of light to be produced by the corresponding LEDs. A program may be implemented on a user device that is configured to communicate with the controller. The program may be implemented to enable a user of the user device to send lighting commands to the controller during gameplay 1332. The lighting commands may be indicative of user-desired changes to lighting provided by the addressable multi-color LED strips, and the controller is configured to implement the commands by sending corresponding signals to the addressable multi-color LED light strips to implement the changes to the lighting. The lighting commands may include, by way of example and not limitation, call-your-shot commands 1333, pattern commands 1334, scorekeeper commands 1335, and game commands 1336.

Figure 14:
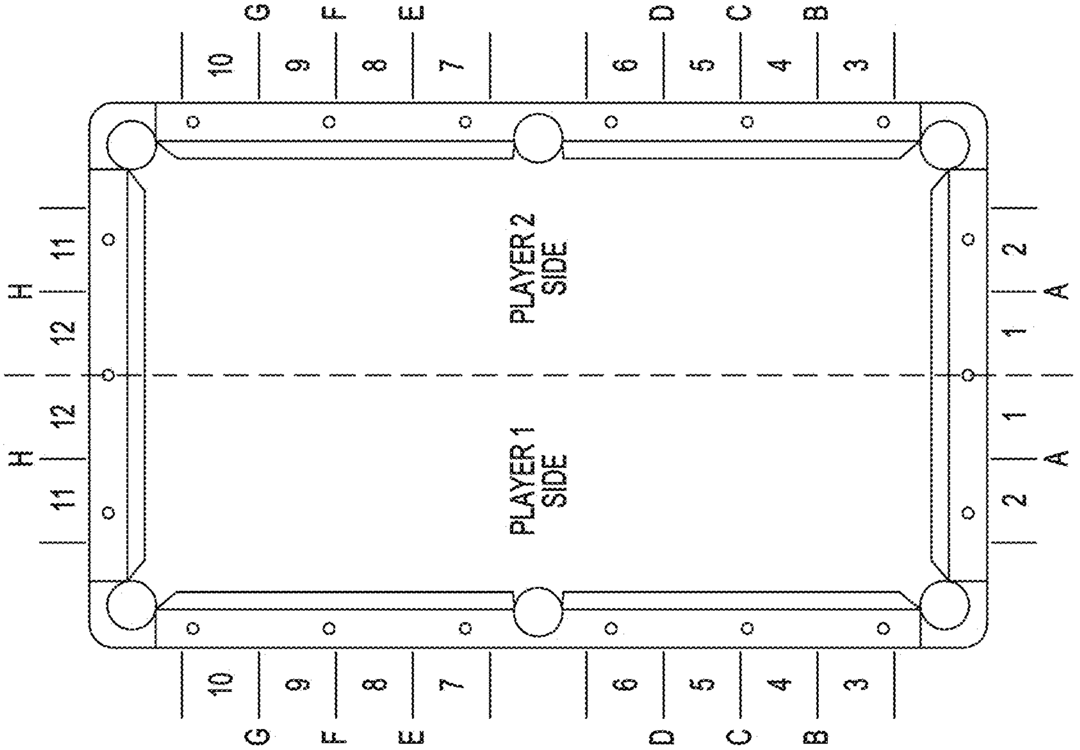
FIG. 14 illustrates, by way of example and not limitation, an embodiment of game and/or set sections for displaying a score using the addressable multicolor LED strips.

FIG. 14 illustrates, by way of example and not limitation, an embodiment of game and/or set sections for displaying a score using the addressable multicolor LED strips. One side of the table may be used to identify score for player 1, and the other side of the table may be used to identify score for player 2. Each side of the table may be split into a number of sections (e.g., 12 sections), which may be used to track the number of games won (e.g., games 1-12) and further may track the number of sets won (sets A-H). Thus, the lights may display the number of games won and then display the number of sets won. Each player may be associated with a color (e.g., player 1 is blue lights and player 2 is red lights). These colors may be selected by the user. By way of example, if player 1 has won 3 games and player 2 has one only 1 game, then control signals may be sent to the LED strips to turn sections 1, 2 and 3 on the player 1 side of the table red, and to turn section 1 on the player 2 side of the table blue. Similarly, sets can be tracked using sections A-H. The system controller may first display the game count for a period of time (e.g., 5 seconds), and then display the set count for a period of time (e.g., 5 seconds). The periods of time may vary, and may be adjusted by the user. Further, a user may select to use different colors to display the set score and game scores for each player.

Figure 15:
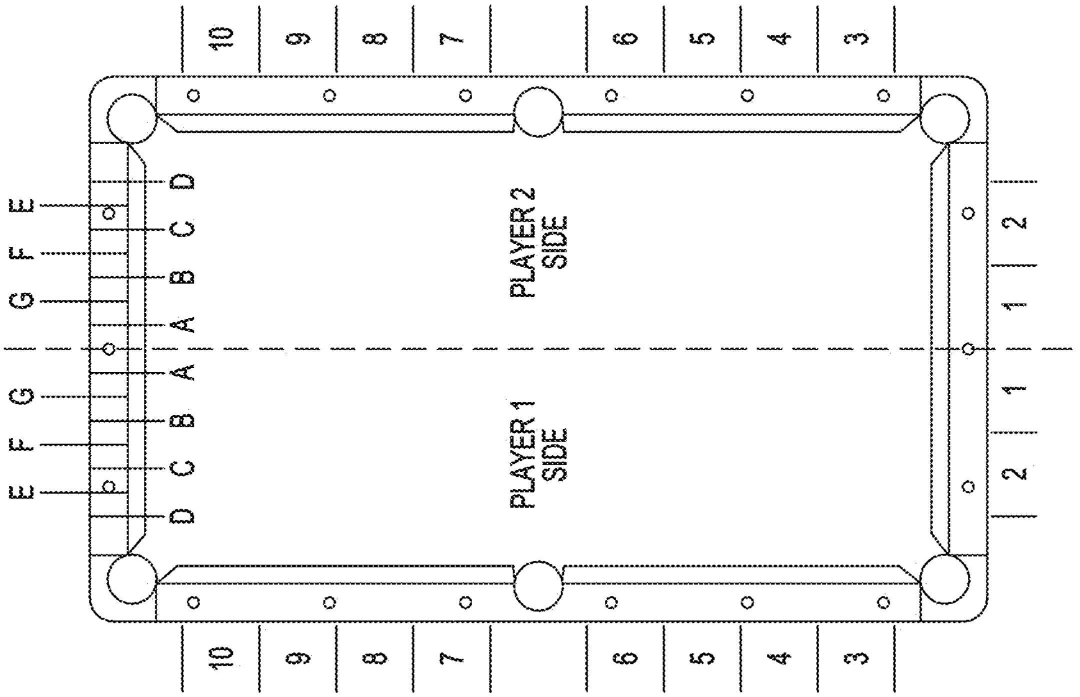
FIG. 15 illustrates, by way of example and not limitation, another embodiment of game and/or set sections for displaying a score using the addressable multicolor LED strips.

FIG. 15 illustrates, by way of example and not limitation, another embodiment of game and/or set sections for displaying a score using the addressable multicolor LED strips. One side of the table may be used to identify score for player 1, and the other side of the table may be used to identify score for player 2. Each side of the table may be split into a number of sections (e.g., 12 sections), which may be used to track the number of games won (e.g., games 1-12). One end of the table may be reserved for use to track the number of sets won (sets A-H). The lights may simultaneously display the number of games won and the number of sets won. User(s) may select the color(s) associated with each player's game score/set scores.

Figure 16:
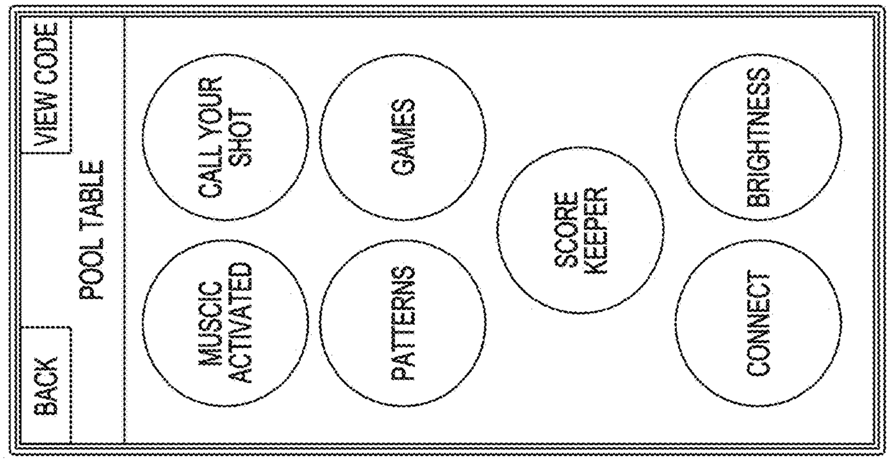
FIG. 16 illustrates, by way of example and not limitation, an embodiment of a home screen for a user interface.

FIG. 16 illustrates, by way of example and not limitation, an embodiment of a home screen for a user interface. The user interface may include various controls (e.g., illustrated by way of example and not limitation as circle regions) that may be selected by the user (e.g., via touch or cursor selection). The illustrated user interface home screen includes a control for music activated command(s), a control for call-your-shot command(s), a control for patterns (e.g., light shows) command(s), a control for games command(s), a control for scorekeeper command(s), and a control for connect command(s). The music activated commands may be used to activate lights with different animations in reaction to sound, where a microphone connected to the system controller may be used to detect sound. The microcontroller will read the signal from the microphone and may be configured to respond by sending various different light commands. The control for the call-your-shot command(s) allow the user to select the pocket on the table in which they intend to make the shot. Once a pocket is selected, at least one pixel on at least one of the adjacent bumpers react accordingly to the mode selected on the controller to mark the pocket. The rest of the table may be controlled according to the mode selected on the controller. The control for the pattern selection command(s) may be used to select the pre-programmed light patterns implemented by the system controller. The control for games command(s) may be used to select which programmed game that they wish to play. In this mode, the lights have different colors, positions, and effects that correlate to meaning. The meaning may be described on the user device. The control for scorekeeping may be used for a user to keep track of different scoring elements by entering the specifications and scores for a game, which may be displayed using certain light/color combinations of the LEDs. The control for connect command(s) may be selected to enable a user to make a connection (e.g., Bluetooth) between the user device and the microcontroller. For example, selection of the button may cause the user device to scan all available Bluetooth devices in the area and will display them in a list form. Once they are displayed, the user can select the system and to connect the phone and microcontroller.

Figure 17:
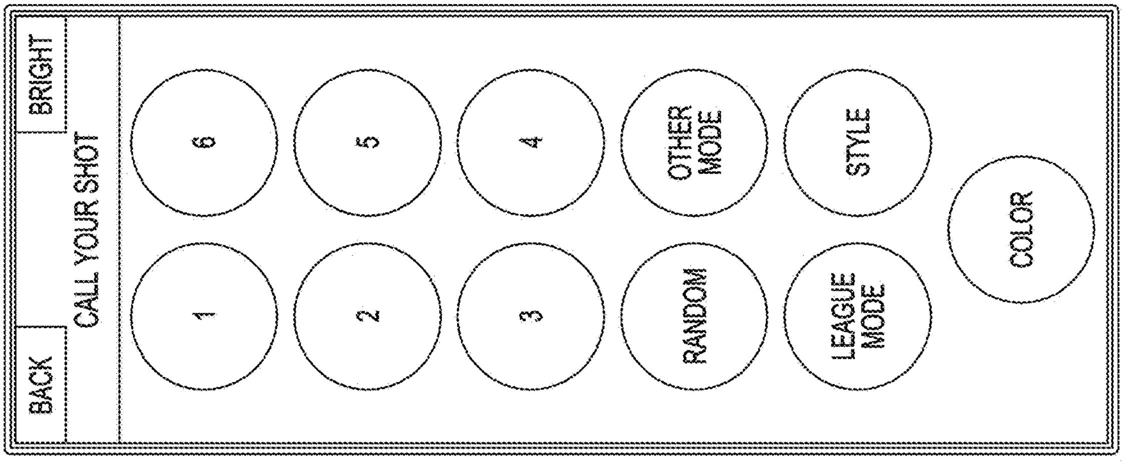
FIG. 17 illustrates, by way of example and not limitation, an embodiment of a call-your-shot screen for a user interface.

FIG. 17 illustrates, by way of example and not limitation, an embodiment of a call-your-shot screen for a user interface. The call-your-shot screen may include buttons or controls labeled 1 through 6 corresponding to the six pockets. When the user selects one of these buttons, the controller tells the system controller which pocket is selected. The system controller may respond by lighting certain LEDs on one or both adjacent bumpers to the pocket that is selected. If the "League Mode" button is filled in, it will only statically light up two pixels on each side adjacent to the pocket, and the rest of the LEDs will be lit to one solid color or the rest of the LEDs may be completely off. Otherwise, the controller may respond by animating light pixels to move along the adjacent pockets in the direction of the pocket on both adjacent bumpers. The four other bumpers not involved in the animation may be controlled according to the user input on the controller by "Other Modes". The selection of the random button or control may cause the system controller to clear the table of all light, select a random number between one and six (corresponding to a random selection of a pocket), and then identify the randomly-selected pocket using at least one pixel on at least one bumper adjacent to the corresponding pocket. The pocket may be identified by the pixels for a period of time. Players may target that pocket with the next shot. The system controller may again clear all of the light and repeat the process. The period of time in which the randomly-selected pocket is identified may be the same or may change (e.g., lengthen). The process may continue to repeatedly select a random pocket from all six pockets or may make the random selection based on the pockets that have not been previously selected such that the process is performed six times until all pockets have been selected. Some embodiments may animate light moving to into the last randomly-selected pocket. The four other bumpers not involved in the animation will be controlled to the setting the user selects by "Other Modes".

Figure 18:
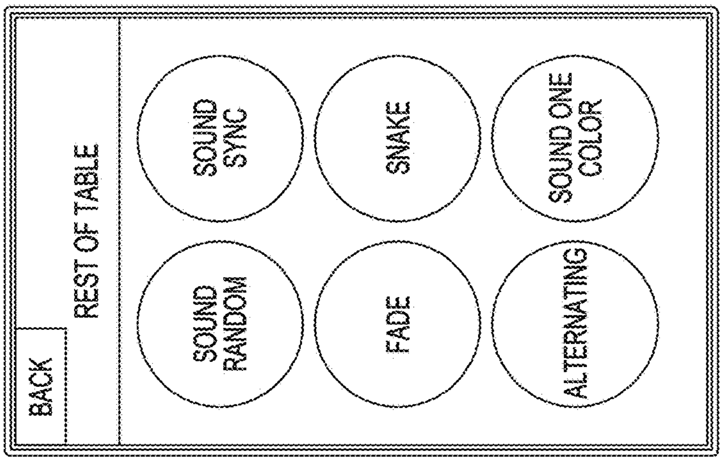
FIG. 18 illustrates, by way of example and not limitation, an embodiment of a user interface screen for controlling a remainder of LEDs during the call-your-shot routine.

The selection of the other button or control may cause the user device to move to the "Other Mode" Screen (see FIG. 18). From here, the user may command the system controller how to control the other four bumpers that are not involved with the animated motion of light toward a selected pocket. If no pocket is selected, then all six bumpers will show the selected effect. If league mode is highlighted, this button is disabled as the whole table is a steady color. The selection of the other button or control may control the effect of calling the shot. If league mode is selected, the table may be a solid, relatively dim color or may be off. All of the LEDs on the strip will be the same color. When 1-6 is selected to select a pocket, the corresponding pocket may have at least one pixel on at least one of the adjacent bumpers light up (e.g., green pixels on both adjacent bumpers to select the pocket). This is to mark the pocket that was called. When the user selects this button again, the system exits out of league mode. All six bumpers will be controlled in the mode selected by the "Other Mode" screen until another pocket is called. Some embodiments may control the color identify the selected pocket based on the player that selected the pocket. The selection of the bright button or control sends the user to the brightness settings, which may be used to adjust the brightness of the lights from that page. Some embodiments may allow a user to select the color used to mark their pocket and/or style of the marking used to mark their pocket.

FIG. 18 illustrates, by way of example and not limitation, an embodiment of a user interface screen for controlling a remainder of LEDs during the call-your-shot routine. The controls for controlling the other LEDs that are not used for the call-your-shot may include a random color or pattern in response to sound, a sync mode in which light is synchronized to sound, a fade mode, a pattern mode (e.g., snake), an alternating mode in which an alternating color is applied (e.g., first color to odd pixels and second color to event pixels), and a one-color response to sound mode.

Figure 19:
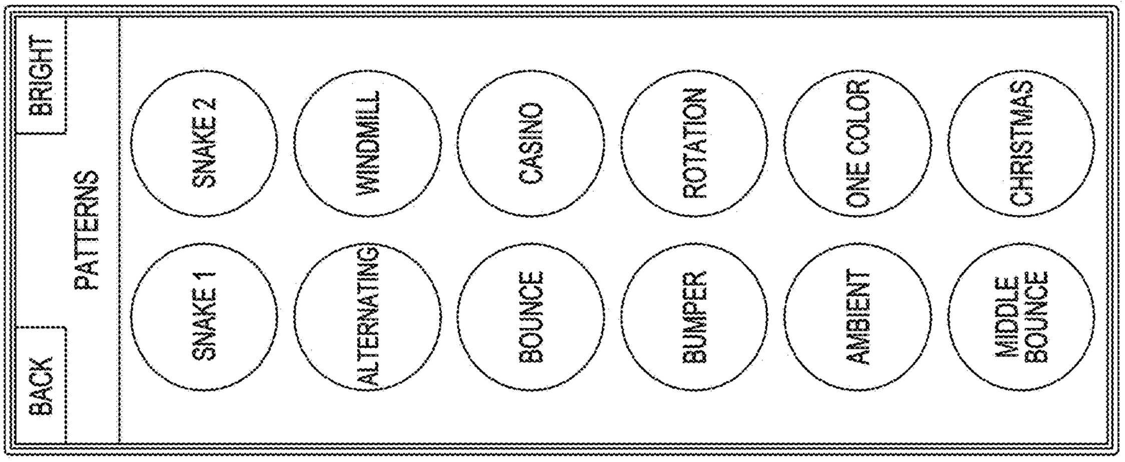
FIG. 19 illustrates, by way of example and not limitation, an embodiment of a pattern screen for a user interface.

FIG. 19 illustrates, by way of example and not limitation, an embodiment of a pattern screen for a user interface. Pattern commands may be indicative of a selection of a pattern. The system controller may be configured to implement the pattern command by sending corresponding signals to the addressable multi-color light strips to provide a spatial pattern of light along the addressable multi-color LED strips according to the selection and further provides a temporal or timing pattern for changing the spatial pattern of light over time. The spatial pattern may be provided by sending RGB values to one or more LED controllers associated with one or more pixels, and the temporal pattern may be provided by varying at least one of a red value, a green value or a blue value to the one or more pixels, or providing light to different ones of the one or more pixels proximate to the pocket.

The following examples are provided by way of example and not limitation. Selection of Snake 1 may cause the system controller to pick a random light color. The pixel to the left of one center pocket and to the right of another may light up with that color. After a delay, the pixel to the left of the first and to the right of the second may light up while keeping the first pixels lit. This process repeats until all of the pixels are lit up the same color. In other words, the effect is a counterclockwise rotation of light, one strand starting from the left of one center pocket and the other strand starting from the right. Once all of the pixels are the same color, the system controller may repeat the process. Selection of Snake 2 may cause the system controller to pick two random light colors. The pixel to the left of one side pocket may light up with the first color and the right of another side pocket will light up with the second color. After a delay, the pixel to the left of the first and to the right of the second will light up while keeping the first pixels lit. The one to the left of first will have the same color as the light adjacent and the one to the right the same as the one adjacent. This process may repeat until all of the pixels are lit up, half the pixels one color and the other half the second color. In other words, the effect is a counterclockwise rotation of light, one strand starting from the left of one center pocket with its own color and the other strand starting from the right with its own color. Once half the pixels are one color and half the other, the system controller will repeat this process.

Selection of Alternating may cause the system controller to select two different colors, lighting up odd numbered pixels the first color and the even colored pixels the second. After a delay, the system controller may repeat the process. Selection of Windmill may cause the system controller to select a random color. The pixel on the counterclockwise direction side of each pocket may light up with that color. After a delay, the adjacent pixel in the counterclockwise direction on each of the six strips may light up. The process may continue until all of the pixels are the same color. The process may be repeated.

Selection of Bounce may cause the system controller to make a first random selection of a color. The pixel on the counterclockwise direction side of each pocket may light up with that color. After a delay, the adjacent pixel in the counterclockwise direction on each of the six strips may light up. The process may repeat until all of the pixels are the same color. After this, the system controller may make a second selection of a random color. The pixel on the clockwise direction side of each pocket may light up with that color. After a delay, the adjacent pixel in the clockwise direction on each of the six strips may light up. The process may repeat until all of the pixels are the same color. The process may repeat with another first random selection of a color. Another pattern "Middle Bounce" may be similar to Bounce, except that the starting pixel is in the middle of the bumper, and the adjacent pixels on each side of the middle pixels are lit, etc. until the bumper is completely lighted up. Holiday patterns (e.g., Christmas) may be created. These Holiday patterns may be a seasonal update for the app.

Selection of Casino may cause the system controller to select a random color. The pixel on the counterclockwise direction side of each pocket may light up with that color. After a very short delay, the adjacent pixel in the counterclockwise direction on each of the six strips may light up.

The process may repeat until all of the pixels are the same color. After this, there is a long delay, and the system controller may repeat the process.

Selection of Ambient may cause the system controller to light up all of the pixels with a color value of 0. After a short delay, the system controller may add one to the value, slightly changing the color. It delays again and adds one. It will repeat delaying and adding one until it reaches 255. At this point, it will reset to 0 and repeat the delaying and adding one to the color value. Selection of One Color may cause the system controller to display a number of colors (e.g., 8 colors) for user-selection. Once a color is selected, the system controller may light all of the pixels to that one color. Selection of Bright may send the user to the brightness settings where they are able to adjust the brightness of the lights.

Various embodiments may use a microphone (as shown in FIG. 2 as "MIC" attached to the system controller 207) to respond or activate based on music or other sound. In a "random" example, when the sound sensor sends a high signal to the system controller, the system controller may assign a random color value to each pixel and will illuminate all of the pixels at once. Each one is a random color. There is a short delay before the system controller turns the pixels off. After they are off, the system controller waits for another signal from the sound sensor and will repeat the process. In a "synchronized" example, when the sound sensor sends a high signal to the system controller, the system controller assigns a random color value to all of the pixels and will illuminate them at once. Each one is the same color as the rest. There is a short delay before the system controller turns the pixels off. After they are off, the system controller waits for another signal from the sound sensor and will repeat the process. In a "one color" example, the user may be taken to the color select screen. Once a color is selected, the system controller waits for a high signal from the sound sensor. When it receives the high signal, it assigns each pixel the color value selected by the user and illuminates them at once. There is a short delay and then it turns all of the pixels off. After this, the system controller waits for another high signal from the sound sensor or a different color input from the user and repeats. In a "shooting star" example, the user may be taken to the color select screen. Once a color is selected, the system controller waits for a high signal from the sound sensor. When it receives that signal, the system controller lights one pixel to the right and left of each pocket with the color chosen by the user. There is a short delay and then all of the pixels turn off. Then, the system controller lights the pixel adjacent to the first pixel in the direction towards the center of the strip. Then, it checks if there is another high signal from the sound sensor. If there is, it repeats the first process of lighting the pixel on each side of each pocket while moving all of the other light locations over one. If not, it repeats this process of lighting, delaying, turning off, moving one over, and lighting again until the pixels reach the end of the strips. In a "brighter" example, the user may be taken to the user to the color select screen. Once a color is selected, the system controller lights up all of the pixels to the color that the user selected at a dim brightness. The system controller waits for a high signal from the sound sensor. When it receives it, it illuminates each pixel to the same color at full brightness. After a short delay, the system controller illuminates each pixel to the same color and the lower, original brightness. It waits for the high signal again and will repeat the process.

Figure 20:
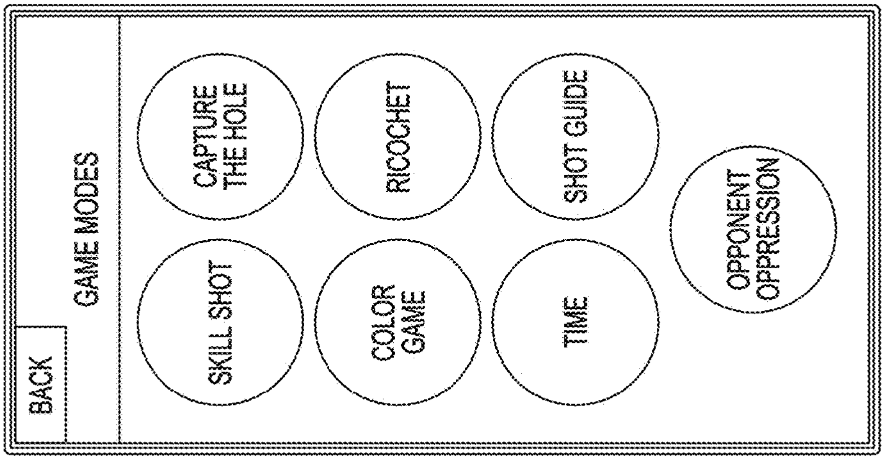
FIG. 20 illustrates, by way of example and not limitation, an embodiment of a game mode screen for a user interface.

FIG. 20 illustrates, by way of example and not limitation, an embodiment of a game mode screen for a user interface. Selection of Skill Shot may cause the system controller to select a random number of bumpers and pockets to light up. The number of each is dependent on the difficulty. In easy mode, the system controller may randomly select five bumpers and five holes. Medium is three bumpers and three holes. Hard is two bumpers and one hole. Pro is one bumper and one hole. The easy, medium, hard and pro modes may correspond to different numbers of bumpers and to different numbers of holes. To light up the pockets, the system controller assigns a color (e.g., blue) to three pixels on each side of the pocket and illuminates them. For the bumpers, the system controller lights up all of the pixels between the ones used for the pockets another color (e.g., green). The player may only ricochet the intended ball off of bumpers that are lit and into pockets that are lit. Other cases induce a penalty equivalent to a scratch. Each player must push "new turn" at the beginning of their turn. Selection of the Skill Shot button may take the user to a screen to select the difficulty of the game. Once the difficulty is set, a screen with one button labeled "New Turn" shows. Each time this button is pressed, the system controller selects new bumpers and holes.

Figure 21:
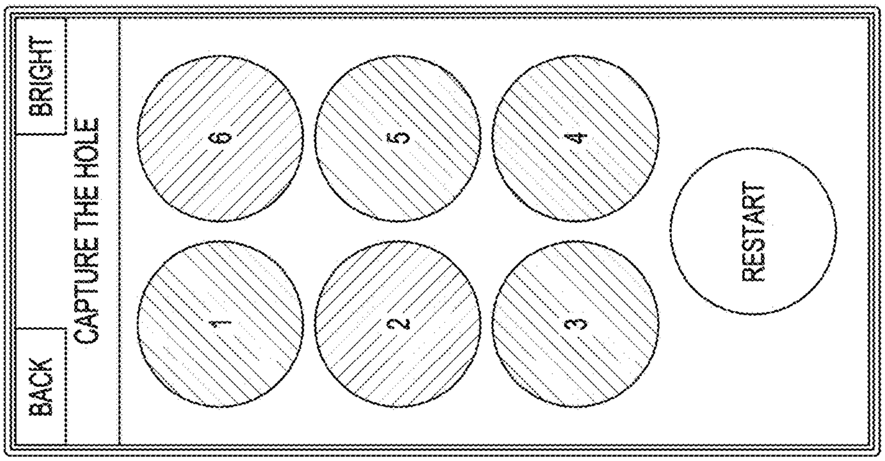
FIG. 21 illustrates, by way of example and not limitation, an embodiment of a capture-the-hole game screen for a user interface.

The object of the capture-the-hole game (see FIG. 21) is to turn the whole pool table into one color by hitting the balls into pockets. The game is played like a normal game of pool: One player is stripes and one is solids. If a player hits one of their balls into a pocket, the player may turn the color of that pocket that player's color. When they miss, it is player two's turn to hit their balls into pockets. They can hit their balls into any of the pockets, but the objective is to get all of the pockets to be their color. When a player hits a ball into their pocket, they may tap the hole on the controller to make it their color. The system controller receives the signal of the hole and the player show owns the hold. It illuminates the half the pixels on the bumper on each side of the pocket. Selection of the capture-the-hole may take the user to the "Capture the Hole" homepage with six pocket buttons, a reset button, and a brightness button. The pocket buttons (1-6) correspond to pockets on the table and tell the system controller the pocket in which a ball was hit. The reset button tells the system controller to clear all the pixels of color and turn them off. The brightness sends the user to the brightness control page, which affects the brightness of the pixels. In FIG. 21, player 1 captured holes 1, 3, 4 and 5, and player 2 captured holes 2 and 6.

Figure 22:
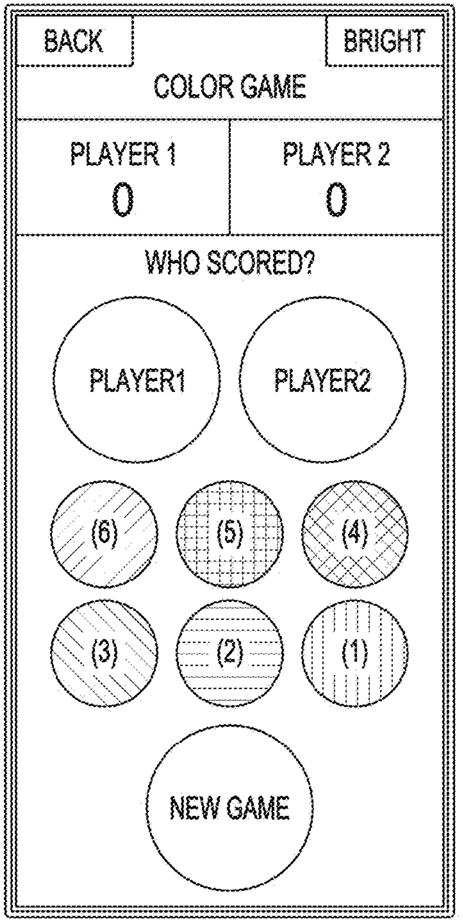
FIG. 22 illustrates, by way of example and not limitation, an embodiment of a color game screen for a user interface.

The object of the color game (see FIG. 22) is to earn points when each ball is pocketed where the points are based on the color of the pocket. Each pocket corresponds to a certain color which corresponds to a number of points. In FIG. 22, for example, pocket 1 corresponds to color 1 and corresponds to 1 point, pocket 2 corresponds to color 2 and corresponds to 2 points, etc. Each player may hit any ball (e.g., no stripes and solids), but their objective is to score as many points as possible. When someone hits that eight ball in the game ends. The goal is to aim for the pocket with the highest point value. The player with the most points when the eight ball is pocketed at the end wins. Normal pool rules apply. The system controller may randomly assign each pocket a value from one to six. There are no repeats, so each value will be unique to that pocket. After this, it will give half of the bumper pixels on each side adjacent to that pocket the color value corresponding to the one through six values assigned. In other words, if the pocket has a value of "1", the system controller will assign blue to half of the pixels on the bumper to the left of the pocket and the right of the pocket. Once it gives all of the pixels their color value, the system controller illuminates the table. It waits until the user selects "new game" in which the system controller will repeat the process of picking values, assigning colors, and illuminating. Selection of the color game button may take the user to the color game home screen. Here, the user may score the game on the user device/controller. It does not communicate with the system controller the score of the game. The user selects which player scored and what color they scored into. Then, that player's score will be updated on the controller. When the game is complete, the user can select "new game" which sends a signal to the system controller to restart its process.

Figure 23:
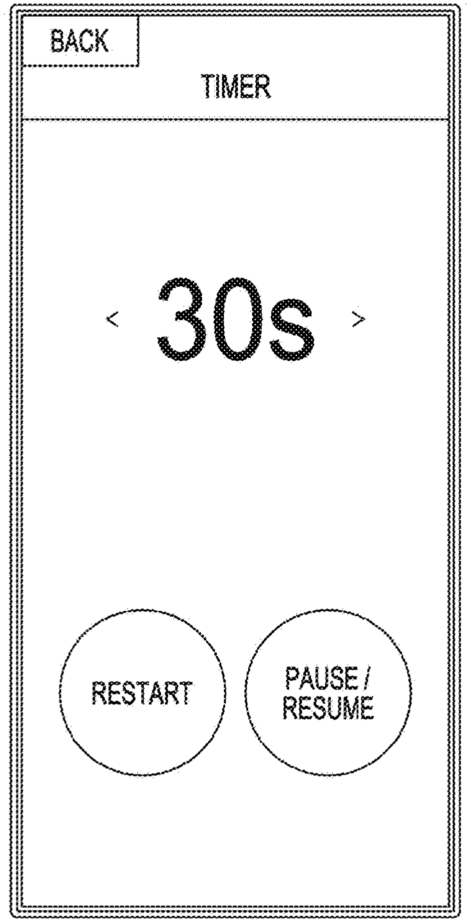
FIG. 23 illustrates, by way of example and not limitation, an embodiment of a timer mode screen for a user interface.

The object of the Timer game mode (see FIG. 23) is for the player make their shot before the table completely turns from one color to another color. For example, the table may light up green initially, and then may turn red based on a time allotted to shoot their shot as determined by their input on the controller. The system controller may initially illuminate all of the pixels to green. After a delay (the delay is taken from the user input on the application), the system controller may change the pixel in the counterclockwise direction of each middle pocket to red. After the same delay, it changes the pixel next to each of the first two in the counterclockwise direction to red. It repeats this change in the counterclockwise direction pattern until all of the pixels are red. Then, the system controller may wait for either a restart signal from the controller or a change in delay time. If either of these are sent during or after the changing to red process, the system controller will turn all of the pixels green and start the process over. Selection of the timer button may take the user to the timer home page. Here, they are able to change the delay time for the table to turn red. This button sends a signal to the system controller to tell it the delay time. The restart button tells the system controller to reset the table to green and start over. Pause/Resume tells the system controller to either pause or return to red. The Timer game mode may have different styles. For example, each bumper may represent the whole time, and time is up when the bumper changes from one color to another color (e.g., change to red).

Other game modes may be provided. For example, a Ricochet game mode has similarities to the Color game mode. Players score points in Ricochet by bouncing balls off of rails and into pockets. An Opponent Oppression game mode may enable an opponent to call the pocket such that, in a two-player game, a first player calls the pocket for the second player, and the second player calls the pocket for the first player.

Figure 24:
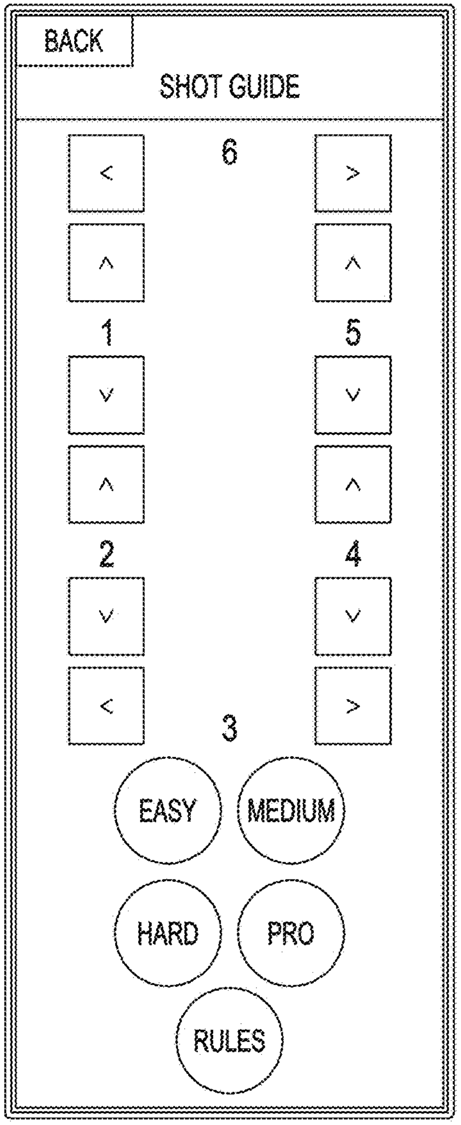
FIG. 24 illustrates, by way of example and not limitation, an embodiment of a shot guide and skill shot screen(s) for a user interface.

Shot Guide is a tool (see FIG. 24) that uses a pixel (or small group of pixels) to give to give a target to aid the player with their aiming. The system controller may light one pixel next to each pocket on the counterclockwise side. It waits for the user to input a change. The user is able to change the location of each pixel either one to the left or one to the right through the user device/controller (e.g., see arrows to move the light). When the system controller receives this input, it turns off the intended pixel and lights the one next to it in the direction specified by the controller. Once this new pixel is lit up, it waits for the next input. Each pixel, six in total, has two buttons, left or right. When the user selects one of these buttons, it sends a signal to the system controller to move that pixel in the selected direction.

Figure 25:
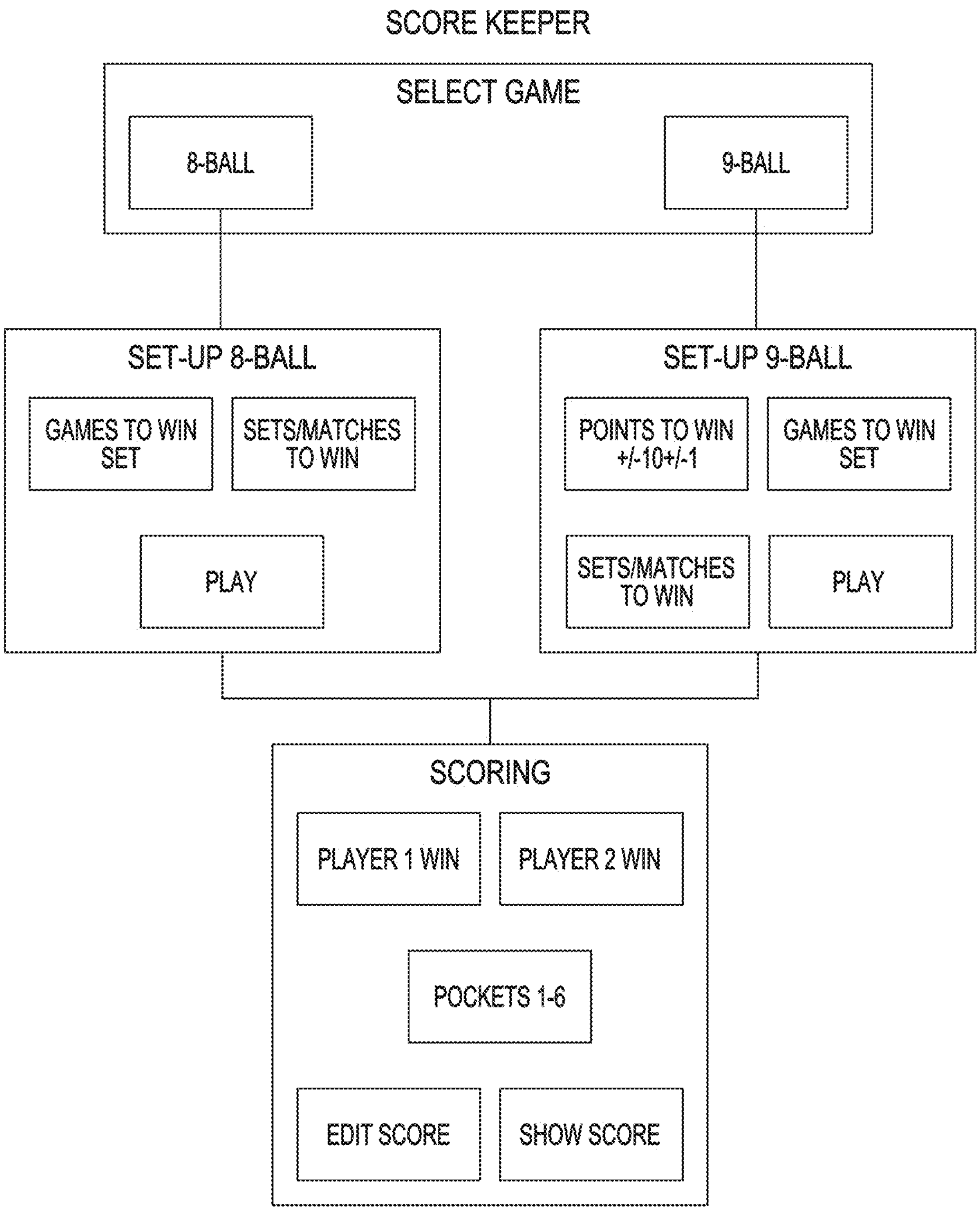
FIG. 25 illustrates, by way of example and not limitation, a method for setting up and scoring different types of billiard games.
Figure 26:
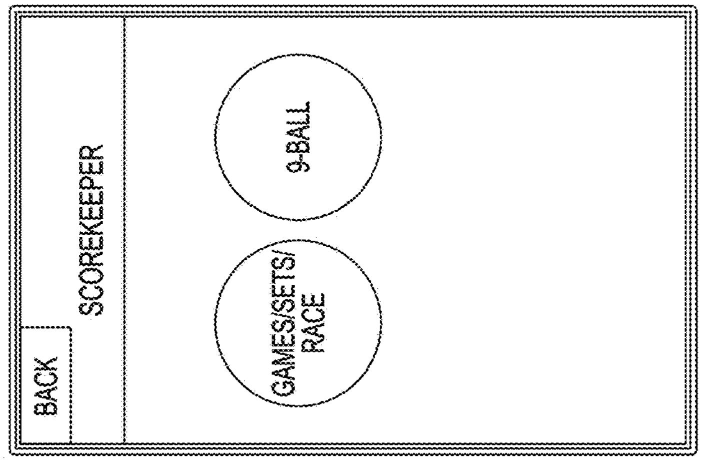
FIGS. 26-30 illustrate, by way of example and not limitation, embodiments of scorekeeper screens for a user interface.
Figure 27:
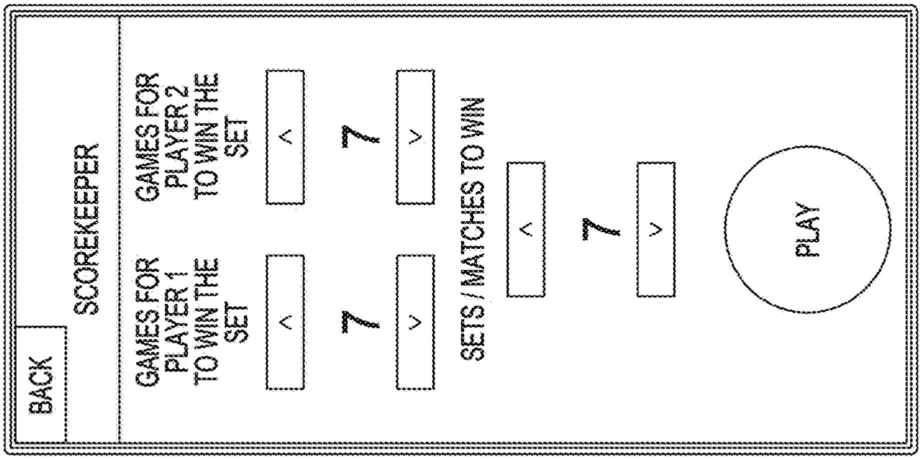
Figure 28:
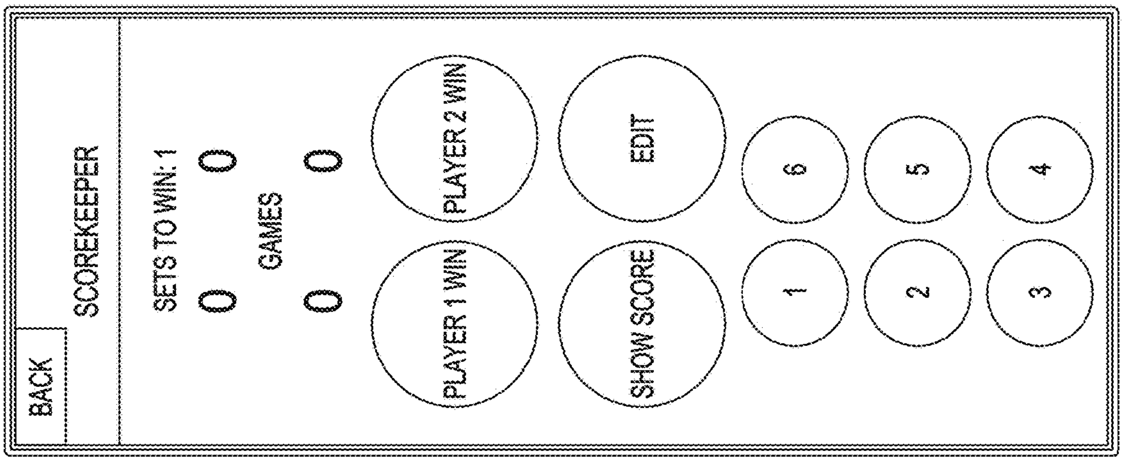
Figure 29:
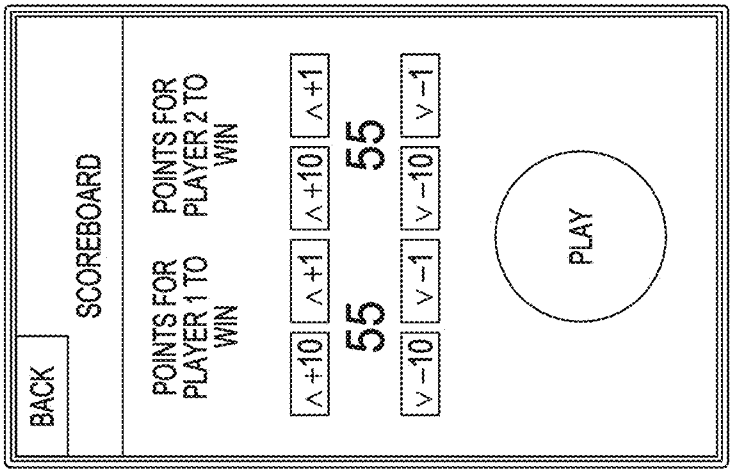
Figure 30:
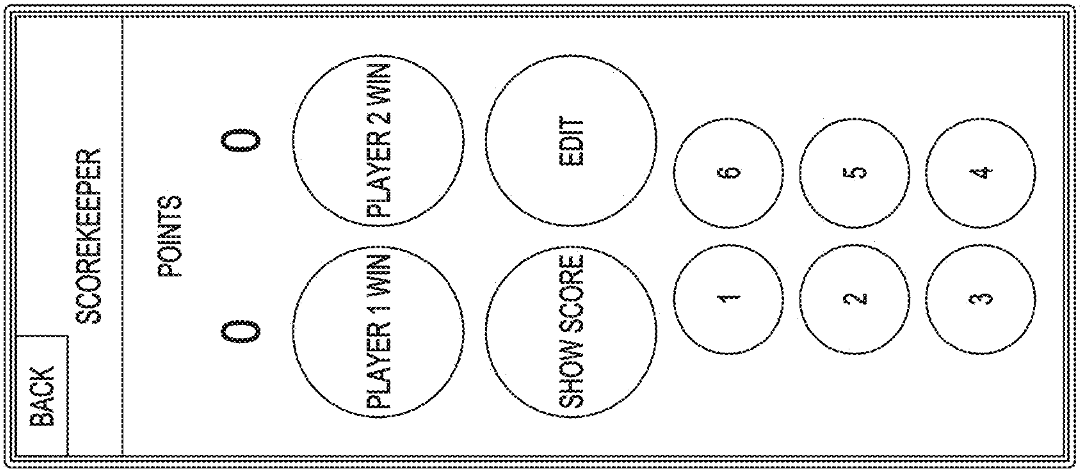

FIG. 25 illustrates, by way of example and not limitation, a method for setting up and scoring different types of billiard games. FIGS. 26-30 illustrate, by way of example and not limitation, embodiments of scorekeeper screens for a user interface. The method may include selecting a type of game to be scored. By way of example and not limitation, a user may select 8-ball or 9-ball. Upon selection of 8-ball, the process sets up scoring for 8-ball, including games to win set, and sets or matches to win. Upon selection of 9-ball, the process sets up scoring for 9-ball, including the number of points to win, the number of games to win a set, and the number sets or matches to win. Upon selecting "play", the method then enables the player to score the game, including entering and editing scores for both players 1 and 2. The score may be shown on the user device as well as by using the sections of LED strips on the tables.

The Games for player one/two to win the set enable the user to change the variables on the system controller that identifies how many games each player needs to win, and the sets/matches to win changes the variable for how many sets/matches the players intend to play. The play button sends the user to the Scorekeeper main page. As generally illustrated in FIGS. 14 and 15, the table may split into two sides, one to keep track for player one and one for player two. Each side is divided into sections of pixels (1-12) and each section has the same number of pixels. These sections (1-12) mark games for each player. In FIG. 14, there are spacer sections (A-H) between each section. These spacer sections may, but do not necessarily, have the same number of pixels in them. Further, the number of pixels in scoring sections may, but is not necessarily, the same as the number of pixels in the spacer sections (A-H) that are used to mark sets for each player. When Play is pressed, the system controller uses the variables for how many games each player has to win. The system controller will light up the section corresponding to player one's variable on their side. It will do the same for player two on their side. Example. if player one needs to win five games and player two needs seven, the system controller may light up section five on the left side green and section seven on the right in green. It is noted that the six LED strips continue to be serially connected. The table split and sections are a visual way of representing how the system controller is coded to identify these sections.

The player 1 win button instructs the system controller that player one won. The system controller will light up the next section on player one's side (1-12) with their color (e.g., blue) while still illuminating the previous sections. Example, if player one won their fifth game, the system controller will illuminate sections one through five. It lights up the sections from low to high. If player one has won the same number of games as his "games for player one to win" variable, the system controller may clear all the sections on both ends, illuminate the section number of the "games for player one to win" one player one's side (same process one player two's side), and light up the next section (A-H). For example, if player one won the game for his 3rd set, the game sections will not be lit up and sections A, B, C will be lit. Sections (A-H) are lit up in orange color. If they have won as many games as their variable and also won the number of sets to match the "Sets/Matches to win variable", the system controller will clear all pixels and perform automated light animations in the color blue to show that player one has won. Selection of the Player 2 Win button causes a similar response as selection of the player 1 win button.

The show score button may cause the system controller to light the sections according to how many games/sets each player has won. The show score may be toggled on and off (e.g., white button corresponds to showing score and green button corresponds to not showing score. All of the pixels are off if the score is not being shown.

The edit button may take the user to the edit page. While this page is present on the controller or user device, all of the pixels will be illuminated on full brightness and a random color. This will let everyone know that an edit is being made. The user is able to edit the scores of each player on this screen. After the edit is complete, the new scores are sent to the system controller. It illuminates player one and two's sides accordingly.

Buttons 1-6 are used to mark the pockets. When one of these buttons are pressed, the system controller receives the number 1-6 and clears all pixels of light. Next, it illuminates the three pixels adjacent to the corresponding pocket (1-6) on each side. If a different 1-6 button is pressed, it will clear all pixels and repeat the process of illuminating three pixels adjacent on both sides. If the same 1-6 button is pressed, the system controller will clear all pixels and show the score, lighting player one and two's game and set sections according to the score stored by the system controller.

The +/−10+/−1 buttons may be used in setting 9-ball. These buttons determine how many points are needed for player one and two to win. The blue controls player one and red player two. There is a max of 75 point and minimum of 1 for each. The numbers for Player 1 and Player 2 are sent to the system controller and stored as the points for each player to win respectively. The system controller clears all pixels and begins the 9-ball scoring mode. If the number of points for either of the players to win is less than 10, the system controller will illuminate the pixels in that number section green for that player. See picture for sections. Else, it will clear all pixels and wait for scoring input.

When the player 1 win button is pressed, the controller or user device may send a signal to the system controller that player one won. The system controller will illuminate the next section (1-10) on player one's side while keeping the previous sections lit. Example, if player one has won six points, sections one through six will light. The color may be blue.

If section ten is lit and the button is pressed, the system controller may clear all of the pixels on player one's side (sections 1-10) and illuminate the next section (A-G) in alphabetical order. Each of these sections represents ten points. For example, if player one has 43 points, the system controller will illuminate sections A, B, C, D and 1, 2, 3. The color for sections A-G is orange (see FIG. 15). When the previous process is implemented, the system controller will check the number of points needed for player one to win. If it is the next ten points, it will illuminate the section corresponding to how many more points are needed in green to show the finish line for player one. In other words, if player one needs 45 points to win and just scored 40, all of the pixels on player one's side will clear, the system controller will light up sections A-D in orange, and section five in green. If the number of points equals the variable set for how many points are required for player one to win, then the system controller will clear all pixels on both sides and start animations in the color blue to show that player one has won.

Figure 31:
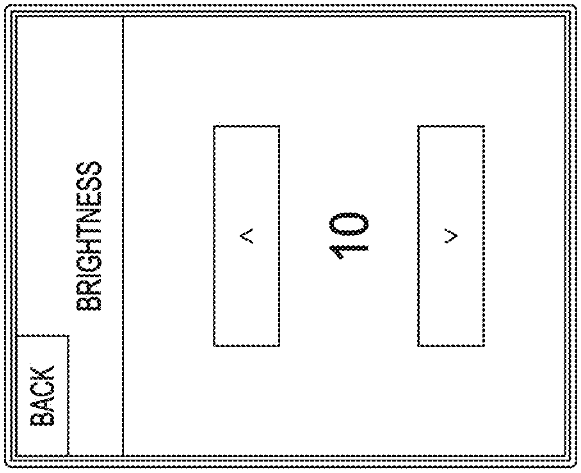
FIG. 31 illustrates, by way of example and not limitation, an embodiment of a brightness screen for controlling the light intensity of the LED strips.

FIG. 31 illustrates, by way of example and not limitation, an embodiment of a brightness screen for controlling the light intensity of the LED strips. The arrow buttons increase and decrease the brightness value, sending respective signal to the microcontroller. The microcontroller adjusts the brightness variable, by appropriately adjusting the red, blue and green bytes, based on the brightness value. It is used in every illumination.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using combinations or permutations of those elements shown or described.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks or cassettes, removable optical disks (e.g., compact disks and digital video disks), memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The scope of the invention should be determined with reference to the appended claims, along with the full scope of equivalents to which such claims are entitled.

What is claimed is:

1. A system for use with a billiards table having rails, comprising:

addressable LEDs positioned on or in the rails of the billiards table, wherein the LEDs are configured to emit light along portions of the rails;

a controller configured to send signals to the addressable LEDs to control which one or more LEDs are activated; and a user device configured to communicate with the controller and to implement a program configured to enable a user of the user device to send lighting commands to the controller during gameplay, wherein the lighting commands are indicative of user-desired changes to lighting provided by the addressable LEDs, and the controller is configured to implement the commands by sending corresponding signals to the addressable LEDs to implement the changes to the lighting.

2. The system of claim 1, wherein the LEDs are positioned within at least one cavity formed in the rails of the billiards table.

3. The system of claim 2, wherein the at least one cavity includes at least one groove.

4. The system of claim 1, further comprising diffusers positioned over the LEDs.

5. The system of claim 1, wherein the LEDs are electrically connected in series.

6. The system of claim 1, wherein the LEDs include at least one LED positioned on each side of a pocket of the billiards table, the LEDs being configured to emit light to visually identify the pocket during gameplay.

7. The system of claim 1, wherein the LEDs are arranged in strips, each strip comprising a plurality of LEDs.

8. The system of claim 7, wherein each strip of LEDs provides a linear arrangement of LEDS with a length corresponding to a length of a bumper of the billiards table.

9. The system of claim 1, wherein the controller is configured to send signals to the LEDs to produce a lighting pattern that dynamically changes during gameplay.

10. The system of claim 1, wherein the user device includes a phone or tablet configured to wirelessly communicate with the controller; or the user device includes a touchscreen monitor on or near the table, wherein the touchscreen monitor is configured communicate with the controller.

11. The system of claim 1, wherein the LEDs are configured to emit light in response to a detected event, the detected event being a ball entering a pocket of the billiards table.

12. The system of claim 1, wherein the LEDs are configured to emit light in different sections of the rails to indicate scores or gameplay status.

13. The system of claim 1, wherein the LEDs are configured to emit light in response to a timer command, the timer command being indicative of an allotted time to play a shot.

14. The system of claim 1, wherein the LEDs are configured to emit light in a pattern that corresponds to a selected gameplay mode, the gameplay mode being selected via the user device.

15. The system of claim 1, wherein the LEDs are configured to emit light in a pattern that highlights a selected pocket during a "call-your-shot" gameplay mode.

16. The system of claim 1, wherein the LEDs are configured to emit light in response to signals from sensors positioned on or near the billiards table, the sensors being configured to detect gameplay events.

17. The system of claim 1, wherein the LEDs are configured to emit light in a pattern that corresponds to a scoring system, the scoring system being displayed on the rails of the billiards table.

18. The system of claim 1, wherein the LEDs are provided as addressable multi-color LED strips.

19. A system for use with a billiards table having rails, comprising:

addressable multi-color strips of LEDs positioned within grooves formed in the rails of the billiards table, wherein the strips of LEDs are configured to emit light along portions of the rails;

the strips of LEDs being electrically connected in series;

diffusers positioned over the strips of LEDs, wherein the diffusers are configured to diffuse light emitted by the LEDs to provide uniform illumination along the rails;

a controller configured to send signals to the addressable multi-color strips of LEDs to control which one or more LEDs are activated and one or more colors of light to be produced by the activated LEDs; and a user device configured to communicate with the controller and to implement a program configured to enable a user of the user device to send lighting commands to the controller during gameplay, wherein the lighting commands are indicative of user-desired changes to lighting provided by the addressable multi-color strips of LEDs, and the controller is configured to implement the commands by sending corresponding signals to the addressable multi-color strips of LEDs to implement the changes to the lighting.

20. A system, comprising:

a billiards table including a playing surface and rails positioned along a perimeter of the playing surface;

addressable LEDs positioned on or in the rails of the billiards table, wherein the LEDs are configured to emit light along portions of the rails;

a controller configured to send signals to the addressable LEDs to control which one or more LEDs are activated; and a user device configured to communicate with the controller and to implement a program configured to enable a user of the user device to send lighting commands to the controller during gameplay, wherein the lighting commands are indicative of user-desired changes to lighting provided by the addressable LEDs, and the controller is configured to implement the commands by sending corresponding signals to the addressable LEDs to implement the changes to the lighting.

* * * * *